(12) United States Patent
Song et al.

(10) Patent No.: US 10,976,523 B2
(45) Date of Patent: Apr. 13, 2021

(54) OPTICAL IMAGING LENS ASSEMBLY

(71) Applicant: Zhejiang Sunny Optical Co., Ltd, Ningbo (CN)

(72) Inventors: Bo Song, Ningbo (CN); Jianke Wenren, Ningbo (CN); Kaiyuan Zhang, Ningbo (CN); Yabin Hu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 188 days.

(21) Appl. No.: 16/229,724

(22) Filed: Dec. 21, 2018

(65) Prior Publication Data

US 2019/0121100 A1 Apr. 25, 2019

Related U.S. Application Data

(63) Continuation of application No. PCT/CN2018/088686, filed on May 28, 2018.

(30) Foreign Application Priority Data

Sep. 13, 2017 (CN) .......................... 201710820209.6
Sep. 13, 2017 (CN) .......................... 201721167337.7

(51) Int. Cl.
G02B 13/00 (2006.01)
G02B 9/64 (2006.01)

(52) U.S. Cl.
CPC ........... G02B 13/0045 (2013.01); G02B 9/64 (2013.01); G02B 13/00 (2013.01)

(58) Field of Classification Search
CPC .............................. G02B 9/64; G02B 13/0045

USPC .................................................. 359/708, 755
See application file for complete search history.

(56) References Cited

U.S. PATENT DOCUMENTS

| | | | | |
|---|---|---|---|---|
| 9,366,845 | B2* | 6/2016 | Huang | G02B 27/0025 |
| 9,541,738 | B2* | 1/2017 | Kubota | G02B 9/64 |
| 9,671,591 | B2* | 6/2017 | Chen | G02B 13/18 |
| 10,324,275 | B2* | 6/2019 | Hsieh | G02B 13/02 |
| 2014/0009843 | A1 | 1/2014 | Tsai et al. | |
| 2014/0139931 | A1 | 5/2014 | Kubota | |
| 2015/0009578 | A1* | 1/2015 | Shinohara | G02B 9/64 |
| | | | | 359/708 |

(Continued)

FOREIGN PATENT DOCUMENTS

| | | |
|---|---|---|
| CN | 104597582 | 5/2015 |
| CN | 106154513 | 11/2016 |

Primary Examiner — Zachary W Wilkes
(74) Attorney, Agent, or Firm — Hauptman Ham, LLP

(57) ABSTRACT

An optical imaging lens assembly is provided. The optical imaging lens assembly includes, sequentially along an optical axis from an object side to an image side, a first lens, a second lens, a third lens, a fourth lens, a fifth lens, a sixth lens, and a seventh lens. The first lens has a positive refractive power, the second lens and the seventh lens have a negative refractive power, and the third, fourth, fifth, and sixth lenses have a positive refractive power or a negative refractive power. Object-side surfaces of the first lens and the second lens are a convex surface, object-side surfaces of the fourth lens and the seventh lens are a concave surface, and image-side surfaces of the first, second, and seventh lens are a concave surface. A total effective focal length f and an entrance pupil diameter EPD of the optical imaging lens assembly satisfy: $f/EPD \leq 1.70$.

16 Claims, 14 Drawing Sheets

(56) References Cited

U.S. PATENT DOCUMENTS

| | | |
|---|---|---|
| 2016/0124191 A1 | 5/2016 | Hashimoto |
| 2018/0188482 A1 | 7/2018 | Jhang et al. |
| 2018/0188483 A1 | 7/2018 | Hsieh et al. |
| 2018/0188487 A1 | 7/2018 | Hsieh et al. |
| 2018/0188488 A1 | 7/2018 | Gong et al. |

* cited by examiner

OPTICAL IMAGING LENS ASSEMBLY

CROSS-REFERENCE TO RELATED APPLICATIONS

This disclosure is a continuation of International Application PCT/CN2018/088686, with an international filing date of May 28, 2018, which claims priority to Chinese Patent Application no. 201710820209.6, filed with the China National Intellectual Property Administration (CNIPA) on Sep. 13, 2017, and Chinese Patent Application no. 201721167337.7, filed with the China National Intellectual Property Administration (CNIPA) on Sep. 13, 2017, the contents of which are incorporated herein by reference in their entirety.

TECHNICAL FIELD

The present disclosure relates to an optical imaging lens assembly, and more specifically to an ultra-thin optical imaging lens assembly including seven lenses and having a large aperture.

BACKGROUND

With the development of science and technology, portable electronic products are gradually increasing, and portable electronic products having camera functions are increasingly favored by the consumers. Therefore, there is an increasing demand for camera lens assemblies suitable for the portable electronic products. The tendency of miniaturization of the portable electronic products would limit the total length of a lens assembly, thereby increasing the difficulty in designing the lens assembly.

Meanwhile, with the improvement in performance and reduction in size of the commonly used photosensitive elements such as charge-coupled devices (CCD) or complementary metal-oxide semiconductor elements (CMOS), the number of pixels on the photosensitive elements is increased and the size of the pixels is reduced. Accordingly, higher requirements on high imaging quality and miniaturization of the counterpart optical imaging lens assemblies have been brought forward.

The reduction of the size of the pixels implies that the light flux of the lens assembly would be reduced in the same exposure time. However, the image sensor, the environment background and so on have some system noises, and thus there are strong needs for the light flux of the optical imaging lens assembly. At this time, the larger the effective amount of light entering the optical imaging lens assembly is, the better the imaging performance of the optical imaging lens assembly is.

Therefore, it is necessary to provide an optical imaging lens assembly that may be suitable for the portable electronic products and have an ultra-thin large aperture and a good imaging quality.

SUMMARY

The present disclosure provides an imaging lens assembly which may be applicable to portable electronic products and may at least or partially solve at least one of the above disadvantages in the existing technology, for example, an ultra-thin lens assembly having a large aperture.

According to an aspect, the present disclosure provides an optical imaging lens assembly. The optical imaging lens assembly includes, sequentially along an optical axis from an object side to an image side, a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface. The second lens may have a negative refractive power, an object-side surface of the second lens may be a convex surface, and an image-side surface of the second lens may be a concave surface. The third lens may have a positive refractive power or a negative refractive power. The fourth lens may have a positive refractive power or a negative refractive power, and an object-side surface of the fourth lens may be a concave surface. The fifth lens may have a positive refractive power or a negative refractive power. The sixth lens may have a positive refractive power or a negative refractive power. The seventh lens may have a negative refractive power, an object-side surface of the seventh lens may be a concave surface, and an image-side surface of the seventh lens may be a concave surface. A total effective focal length f of the optical imaging lens assembly and an entrance pupil diameter EPD of the optical imaging lens assembly may satisfy: $f/EPD \le 1.70$.

In an implementation, the total effective focal length f of the optical imaging lens assembly and an effective focal length f5 of the fifth lens may satisfy: $|f/f5| \le 1.0$.

In an implementation, the total effective focal length f of the optical imaging lens assembly and an effective focal length f6 of the sixth lens may satisfy: $-0.5 < f/f6 < 1.5$.

In an implementation, a spacing distance T23 on the optical axis between the second lens and the third lens, a spacing distance T34 on the optical axis between the third lens and the fourth lens, a spacing distance T45 on the optical axis between the fourth lens and the fifth lens, a spacing distance T56 on the optical axis between the fifth lens and the sixth lens, and a spacing distance T67 on the optical axis between the sixth lens and the seventh lens may satisfy: $0 < (T23+T34+T45)/(T56+T67) < 3.0$.

In an implementation, the spacing distance T23 on the optical axis between the second lens and the third lens, the spacing distance T34 on the optical axis between the third lens and the fourth lens, the spacing distance T45 on the optical axis between the fourth lens and the fifth lens, the spacing distance T56 on the optical axis between the fifth lens and the sixth lens, and the spacing distance T67 on the optical axis between the sixth lens and the seventh lens may satisfy: $1.5 < (T23+T34+T45)/(T56+T67) < 3.0$.

In an implementation, the spacing distance T56 on the optical axis between the fifth lens and the sixth lens and the spacing distance T67 on the optical axis between the sixth lens and the seventh lens may satisfy: $0 < T56/T67 < 5$.

In an implementation, a radius of curvature R3 of the object-side surface of the second lens and a radius of curvature R4 of the image-side surface of the second lens may satisfy: $2 < R3/R4 < 5$.

In an implementation, a radius of curvature R11 of an object-side surface of the sixth lens and a radius of curvature R12 of an image-side surface of the sixth lens may satisfy: $-10 < R11/R12 < 5$.

In an implementation, the optical imaging lens assembly may further include a diaphragm disposed between the second lens and the third lens.

In an implementation, an axial distance TTL from the object-side surface of the first lens to an image plane of the optical imaging lens assembly and half of a diagonal length ImgH of an effective pixel area on the image plane may satisfy: $TTL/ImgH < 1.6$.

In an implementation, a maximum field-of-view FOV of the optical imaging lens assembly may satisfy: 70°<FOV<80°

In an implementation, the axial distance TTL from the object-side surface of the first lens to the image plane of the optical imaging lens assembly and the total effective focal length f of the optical imaging lens assembly may satisfy: 1.0<TTL/f<2.0.

In an implementation, the half of the diagonal length ImgH of the effective pixel area on the image plane, the total effective focal length f of the optical imaging lens assembly, and the entrance pupil diameter EPD of the optical imaging lens assembly may satisfy: 1 mm<ImgH/(f/EPD)<3 mm.

According to another aspect, the present disclosure further provides an optical imaging lens assembly. The optical imaging lens assembly includes, sequentially along an optical axis from an object side to an image side, a first lens, a second lens, a third lens, a fourth lens, a fifth lens, a sixth lens, and a seventh lens. Each of the first lens and the third lens may have a positive refractive power. At least one of the second lens or the seventh lens may have a negative refractive power. Each of the fourth lens, the fifth lens, and the sixth lens may have a positive refractive power or a negative refractive power. An object-side surface of the first lens may be a convex surface, and an image-side surface of the first lens may be a concave surface. An object-side surface of the fourth lens may be a concave surface. An object-side surface of the fifth lens may be a convex surface. An object-side surface and an image-side surface of the seventh lens may both be concave surfaces. Half of a diagonal length ImgH of an effective pixel area on an image plane of the optical imaging lens assembly, a total effective focal length f of the optical imaging lens assembly, and an entrance pupil diameter EPD of the optical imaging lens assembly may satisfy: 1 mm<ImgH/(f/EPD)<3 mm.

In an implementation, each of the second lens and the seventh lens may have a negative refractive power.

According to another aspect, the present disclosure provides an optical imaging lens assembly. The optical imaging lens assembly includes, sequentially along an optical axis from an object side to an image side, a first lens, a second lens, a third lens, a fourth lens, a fifth lens, a sixth lens, and a seventh lens. The first lens may have a positive refractive power, an object-side surface of the first lens may be a convex surface, and an image-side surface of the first lens may be a concave surface. The second lens may have a negative refractive power, an object-side surface of the second lens may be a convex surface, and an image-side surface of the second lens may be a concave surface. The third lens may have a positive refractive power or a negative refractive power. The fourth lens may have a positive refractive power or a negative refractive power, and an object-side surface of the fourth lens may be a concave surface. The fifth lens may have a positive refractive power or a negative refractive power. The sixth lens may have a positive refractive power or a negative refractive power. The seventh lens may have a negative refractive power, an object-side surface of the seventh lens may be a concave surface, and an image-side surface of the seventh lens may be a concave surface. A radius of curvature R3 of the object-side surface of the second lens and a radius of curvature R4 of the image-side surface of the second lens may satisfy: 2<R3/R4<5.

The present disclose adopts a plurality of lenses, for example, seven lenses. By reasonably distributing the refractive powers and the surface types of the lenses, the center thicknesses of the lenses, the spacing distances on the optical axis between the lenses, etc., the system has advantages of the large aperture in the process of increasing the amount of the light admitted, thus improving the imaging effect of the optical imaging lens assembly. Meanwhile, the lens assembly with the above configuration may have at least one of the beneficial effects of ultra-thin, miniaturization, large-aperture, or high imaging quality.

BRIEF DESCRIPTION OF THE DRAWINGS

By describing non-limiting implementations below in detail with reference to the accompanying drawings, other features, objectives and advantages of the present disclosure will be more apparent. In the accompanying drawings.

DETAILED DESCRIPTION

Figure 1:
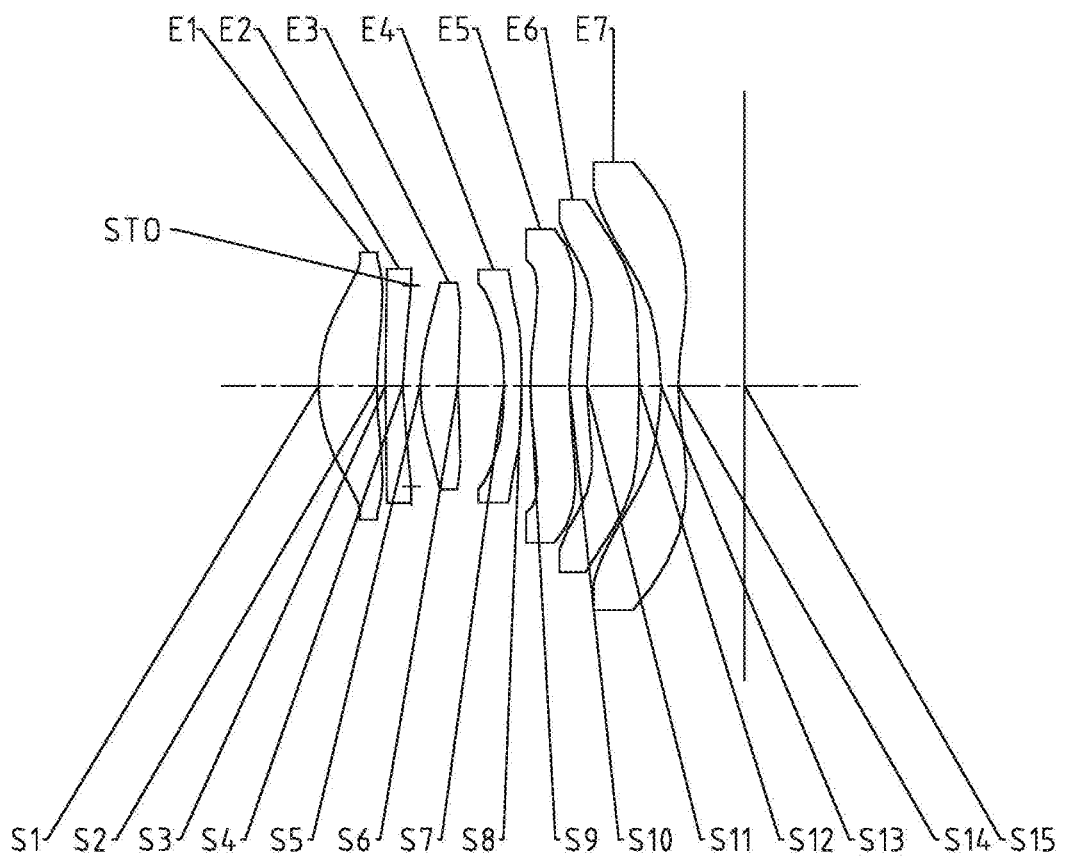
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to exemplary implementations of the present disclosure includes, for example, seven lenses (i.e., a first lens, a second lens, a third lens, a fourth lens, a fifth lens, a sixth lens, and a seventh lens). The seven lenses are arranged in sequence along an optical axis from an object side to an image side. The optical imaging lens assembly may further include a photosensitive element disposed on an image plane.

The first lens may have a positive refractive power, the object-side surface of the first lens may be a convex surface, and the image-side surface of the first lens may be a concave surface. The second lens may have a negative refractive power, and the third lens has a positive refractive power or a negative refractive power. The fourth lens has a positive refractive power or a negative refractive power, and the object-side surface of the fourth lens may be a concave surface. The fifth lens has a positive refractive power or a negative refractive power, and the object-side surface of the fifth lens may be a convex surface. The sixth lens has a positive refractive power Jr a negative refractive power. The seventh lens may have a negative refractive power, the object-side surface of the seventh lens may be a concave surface, and the image-side surface of the seventh lens may be a concave surface.

In the exemplary implementations, the object-side surface of the second lens may be a convex surface, and the image-side surface of the second lens may be a concave surface. A radius of curvature R3 of the object-side surface of the second lens and a radius of curvature R4 of the image-side surface of the second lens may satisfy: $2<R3/R4<5$, and more specifically, R3 and R4 may further satisfy: $2.08 \leq R3/R4 \leq 4.27$. By controlling the radii of curvature of the object-side surface and the image-side surface of the second lens, the refractive power of the second lens may be effectively controlled.

In the exemplary implementations, the third lens may have a positive refractive power, the object-side surface of the third lens may be a convex surface, and the image-side surface of the third lens may be a concave surface.

In the exemplary implementations, the fourth lens may have a negative refractive power, and the image-side surface of the fourth lens may be a convex surface.

In the exemplary implementations, the fifth lens may have the positive refractive power or the negative refractive power. The object-side surface of the fifth lens may be the convex surface, and the image-side surface of the fifth lens may be a convex surface or a concave surface. A total effective focal length f of the optical imaging lens assembly and an effective focal length f5 of the fifth lens may satisfy: $|f/f5| \leq 1.0$, and more specifically, f and f5 may further satisfy: $0.001 \leq |f/f5| \leq 0.45$. By reasonably controlling the refractive power of the fifth lens, the comatic aberration of the system may be effectively controlled.

In the exemplary implementations, the sixth lens may have the positive refractive power or the negative refractive power. The total effective focal length f of the optical imaging lens assembly and an effective focal length f6 of the sixth lens may satisfy: $-0.5<f/f6<1.5$, and more specifically, f and f6 may further satisfy: $-0.08 \le f/f6 \le 1.29$. By reasonably controlling the refractive power of the sixth lens, the field curvature and the distortion of the system may be effectively controlled. The object-side surface of the sixth lens may be a convex surface or a concave surface, and the image-side surface of the sixth lens may be a convex surface. A radius of curvature R11 of the object-side surface of the sixth lens and a radius of curvature R12 of the image-side surface of the sixth lens may satisfy: $-10<R11/R12<5$, and more specifically, R11 and R12 may satisfy: $-9.0 \le R11/R12 \le 1.0$, and R11 and R12 may further satisfy: $-8.66 \le R11/R12 \le 0.93$. By reasonably controlling the radii of curvature of the object-side surface and the image-side surface of the sixth lens, the chief ray angle of the optical imaging system is controlled within a reasonable range.

Each of the second lens and the seventh lens may have a negative refractive power. Alternatively, an effective focal length f2 of the second lens and an effective focal length f7 of the seventh lens may satisfy: $2.41 \le f2/f7<7.0$, and more specifically, f2 and f7 may further satisfy: $2.8<f2/f7<7.0$. For example, f2 and f7 may satisfy: $2.41 \le f2/f7 \le 3.45$. By reasonably assigning the refractive power of each lens, the low-order aberrations of the system may be effectively balanced.

In the application, the distances on the axis between the lenses may also be optimized to enhance the optical performances of the lens assembly. For example, a spacing distance T56 on the optical axis between the fifth lens and the sixth lens, and a spacing distance T67 on the optical axis between the sixth lens and the seventh lens may satisfy: $0<T56/T67<5$, and more specifically, T56 and T67 may further satisfy: $0.76 \le T56/T67 \le 3.07$. By controlling the spacing distance between the fifth lens and the sixth lens, and the spacing distance between the sixth lens and the seventh lens, the field curvature of the system may be effectively balanced.

A spacing distance T23 on the optical axis between the second lens and the third lens, a spacing distance T34 on the optical axis between the third lens and the fourth lens, a spacing distance T45 on the optical axis between the fourth lens and the fifth lens, the spacing distance T56 on the optical axis between the fifth lens and the sixth lens, and the spacing distance T67 on the optical axis between the sixth lens and the seventh lens may satisfy: $0<(T23+T34+T45)/(T56+T67)<3.0$, and more specifically, T23, T34, T45, T56, and T67 may further satisfy: $1.5<(T23+T34+T45)/(T56+T67)<3.0$, for example, $1.591 \le (T23+T34+T45)/(T56+T67) \le 2.29$. By controlling the spacing distances on the optical axis between the second lens, the third lens, the fourth lens, the fifth lens, the sixth lens, and the seventh lens, the total track length of the optical imaging system is controlled, so that the optical imaging system obtains a good processability.

The optical imaging lens assembly may further include a diaphragm disposed between the second lens and the third lens. By reasonably selecting the position of the diaphragm, the lateral chromatic aberration of the optical imaging system is effectively controlled.

The total effective focal length f of the optical imaging lens assembly and an entrance pupil diameter EPD of the optical imaging lens assembly may satisfy: $f/EPD \le 1.70$, and more specifically, f and EPD may further satisfy: $1.46 \le f/EPD \le 1.68$. The smaller the F-number Fno of the optical imaging lens assembly (i.e., the total effective focal length f of the lens assembly/the entrance pupil diameter EPD the lens assembly) is, the larger the clear aperture of the lens assembly is, and the larger the amount of light entering in the same unit time is. The reduction of the F-number Fno may effectively enhance the brightness of the image plane, so that the lens assembly can better satisfy the shooting needs when the light is insufficient. By satisfying the conditional expression $f/EPD \le 1.70$, the lens assembly may have advantages of the large aperture in the process of increasing the amount of light admitted, thereby enhancing the imaging effect of the optical imaging lens assembly.

Half of a diagonal length ImgH of an effective pixel area on the image plane of the optical imaging lens assembly, the the total effective focal length f of the optical imaging lens assembly, and the entrance pupil diameter EPD of the optical imaging lens assembly may satisfy: $1\ mm<ImgH/(f/EPD)<3\ mm$, and more specifically, ImgH, f and EPD may further satisfy: $1.99\ mm \le ImgH/(f/EPD) \le 2.30\ mm$. Satisfying the conditional expression $1\ mm<ImgH/(f/EPD)<3\ mm$ may reflect the characteristics of the large image plane and the large aperture of the lens assembly.

The total track length TTL of the optical imaging lens assembly (i.e., the axial distance from the object-side surface of the first lens to the image plane of the optical imaging lens assembly), and the half of the diagonal length ImgH of the effective pixel area on the image plane of the optical imaging lens assembly may satisfy: $TTL/ImgH<1.6$, and more specifically, TTL and ImgH may further satisfy: $1.41 \le TTL/ImgH \le 1.50$. When the conditional expression $TTL/ImgH<1.6$ is satisfied, the total track length of the lens assembly may be effectively compressed while ensuring a large imaging area of the lens assembly, thereby achieving ultra-thin characteristics and miniaturization of the lens assembly.

The total track length TTL of the optical imaging lens assembly, and the total effective focal length f of the optical imaging lens assembly may satisfy: $1.0<TTL/f<2.0$, and more specifically, TTL and f may further satisfy: $1.18 \le TTL/f \le 1.23$, which may reflect the miniaturization characteristics of the lens assembly. In addition, by controlling the total effective focal length of the lens assembly within a reasonable range, the field-of-view of the lens assembly may be further controlled.

A maximum field-of-view FOV of the optical imaging lens assembly may satisfy: $70°<FOV<80°$, and more specifically, FOV may further satisfy: $75.0° \le FOV \le 78.8°$. By controlling the full field-of-view FOV of the lens assembly, the imaging range of the system may be effectively controlled.

Alternatively, the optical imaging lens assembly may further include an optical filter for correcting color deviations and/or a protective glass for protecting the photosensitive element on the image plane.

By reasonably distributing the refractive powers and the surface types of the lenses, the center thicknesses of the lenses, the spacing distances on the axis between the lenses, etc., the sensitivity of the lens assembly is reduced and the processability of the lens assembly is improved while ensuring the miniaturization of lens assembly, thus making the optical imaging lens assembly more conducive to the production and processing and applicable to the portable electronic products. In addition, the optical imaging lens assembly with the above configuration may further have beneficial effects such as ultra-thin, large-aperture, wide-angle, and high imaging quality.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the implementations, the optical imaging lens assembly is not limited to include seven lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a negative refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 1 shows the surface type, the radius of curvature, the thickness, the material and the conic coefficient of each lens of the optical imaging lens assembly in Embodiment 1. The units of the radius of curvature and the thickness are both millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8964 | 0.6777 | 1.55 | 56.1 | 0.0651 |
| S2 | aspheric | 5.0816 | 0.1000 | | | 2.6313 |
| S3 | aspheric | 9.5706 | 0.2013 | 1.67 | 20.4 | −99.0000 |
| S4 | aspheric | 3.3512 | 0.1018 | | | −24.5532 |
| STO | spherical | infinite | 0.1003 | | | 0.0000 |
| S5 | aspheric | 2.0219 | 0.4382 | 1.55 | 56.1 | −1.0517 |
| S6 | aspheric | 6.9822 | 0.5378 | | | 16.9241 |
| S7 | aspheric | −5.0548 | 0.2043 | 1.65 | 23.5 | 12.7776 |
| S8 | aspheric | −9.3670 | 0.1006 | | | 36.5439 |
| S9 | aspheric | 5.3798 | 0.4553 | 1.55 | 56.1 | 5.9487 |
| S10 | aspheric | 3.9250 | 0.2032 | | | −98.5346 |
| S11 | aspheric | 3.1807 | 0.6092 | 1.65 | 23.5 | −23.5967 |
| S12 | aspheric | −5.0886 | 0.2519 | | | −12.5163 |
| S13 | aspheric | −2.7564 | 0.2000 | 1.54 | 55.7 | −0.0471 |
| S14 | aspheric | 2.6278 | 0.7719 | | | −31.1087 |
| S15 | spherical | infinite | | | | |

As may be obtained from Table 1, the radius of curvature R3 of the object-side surface S3 of the second lens E2 and the radius of curvature R4 of the image-side surface S4 of the second lens E2 satisfy: R3/R4=2.86. The radius of curvature R11 of the object-side surface S11 of the sixth lens E6 and the radius of curvature R12 of the image-side surface S12 of the sixth lens satisfy: R11/R12=−0.63. The spacing distance T56 on the optical axis between the fifth lens E5 and the sixth lens E6 and the spacing distance T67 on the optical axis between the sixth lens E6 and the seventh lens E7 satisfy: T56/T67=0.81. The spacing distance T23 on the optical axis between the second lens E2 and the third lens E3, the spacing distance T34 on the optical axis between the third lens E3 and the fourth lens E4, the spacing distance T45 on the optical axis between the fourth lens E4 and the fifth lens E5, the spacing distance T56 on the optical axis between the fifth lens E5 and the sixth lens E6, and the spacing distance T67 on the optical axis between the sixth lens E6 and the seventh lens E7 satisfy: (T23+T34+T45)/(T56+T67)=1.85.

In this embodiment, each lens may be an aspheric lens. The surface type x of each aspheric surface is defined by the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S14 in Embodiment 1.

TABLE 3

| parameter | | | | |
|---|---|---|---|---|
| f1 (mm) | f2 (mm) | f3 (mm) | f4 (mm) | f5 (mm) |
| numerical value 5.16 | −7.85 | 5.06 | −17.39 | −29.89 |

| parameter | | | | |
|---|---|---|---|---|
| f6 (mm) | f7 (mm) | f (mm) | TTL (mm) | ImgH (mm) |
| numerical value 3.13 | −2.48 | 4.05 | 4.95 | 3.40 |

As may be obtained from Table 3, the effective focal length f2 of the second lens E2 and the effective focal length f7 of the seventh lens E7 satisfy: f2/f7=3.17. The total effective focal length f of the optical imaging lens assembly and the effective focal length f5 of the fifth lens E5 satisfy: |f/f5|=0.14. The total effective focal length f of the optical imaging lens assembly and the effective focal length f6 of the sixth lens E6 satisfy: f/f6=1.29. The total track length TTL of the optical imaging lens assembly and the total effective focal length f of the optical imaging lens assembly satisfy: TTL/f=1.22. The total track length TTL of the optical imaging lens assembly and the half of the diagonal

TABLE 2

| surface number | A4 | A6 | A8 | A10 | A12 |
|---|---|---|---|---|---|
| S1 | −1.0220E−02 | 3.5670E−03 | −2.0140E−02 | 1.4214E−02 | −2.4800E−03 |
| S2 | 9.7770E−03 | −7.8810E−02 | 1.0056E−01 | −2.0637E−01 | 2.6886E−01 |
| S3 | −1.3280E−02 | −4.6660E−02 | 7.1207E−02 | −1.4921E−01 | 2.3897E−01 |
| S4 | −2.0170E−02 | −4.0520E−02 | 7.6198E−02 | −1.3542E−01 | 2.4937E−01 |
| S5 | −5.8680E−02 | 1.7225E−02 | −7.4430E−02 | 1.0228E−01 | −8.4890E−02 |
| S6 | −1.2950E−02 | −6.8600E−02 | 1.9685E−01 | −7.2608E−01 | 1.4488E+00 |
| S7 | 6.3019E−02 | −6.0066E−01 | 1.2894E+00 | −1.4439E+00 | 3.0043E−01 |
| S8 | 2.3723E−01 | −1.1726E+00 | 2.4599E+00 | −3.3477E+00 | 2.9952E+00 |
| S9 | 1.6497E−01 | −5.3239E−01 | 8.4821E−01 | −9.4246E−01 | 6.8516E−01 |
| S10 | 1.9680E−02 | −3.0270E−02 | 4.0024E−02 | −6.4200E−02 | 5.3165E−02 |
| S11 | −4.6480E−02 | 6.0779E−02 | −2.0016E−01 | 2.2503E−01 | −1.3679E−01 |
| S12 | 1.5596E−01 | −1.1830E−01 | −3.0250E−02 | 5.1385E−02 | −1.2590E−02 |
| S13 | 1.0493E−01 | −1.8520E−02 | −2.0657E−01 | 2.4725E−01 | −1.3209E−01 |
| S14 | 5.1371E−02 | −1.4214E−01 | 1.0463E−01 | −4.1050E−02 | 9.4220E−03 |

| surface number | A14 | A16 | A18 | A20 |
|---|---|---|---|---|
| S1 | −5.7100E−03 | 4.2810E−03 | −1.2400E−03 | 1.3700E−04 |
| S2 | −1.9263E−01 | 7.7579E−02 | −1.6690E−02 | 1.5000E−03 |
| S3 | −2.0857E−01 | 9.9758E−02 | −2.4880E−02 | 2.5580E−03 |
| S4 | −2.8931E−01 | 1.8897E−01 | −6.5260E−02 | 9.5410E−03 |
| S5 | 8.8320E−03 | 4.9761E−02 | −3.5430E−02 | 7.8010E−03 |
| S6 | −1.7213E+00 | 1.2280E+00 | −4.8156E−01 | 7.9666E−02 |
| S7 | 1.3348E+00 | −1.6597E+00 | 8.1033E−01 | −1.5006E−01 |
| S8 | −1.6375E+00 | 5.0393E−01 | −7.5230E−02 | 3.5170E−03 |
| S9 | −3.0589E−01 | 7.5012E−02 | −7.1800E−03 | −2.3000E−04 |
| S10 | −2.4970E−02 | 7.0030E−03 | −1.1100E−03 | 7.6700E−05 |
| S11 | 4.8906E−02 | −1.0040E−02 | 1.0730E−03 | −4.5000E−05 |
| S12 | −3.0600E−03 | 2.0120E−03 | −3.5000E−04 | 2.1400E−05 |
| S13 | 3.9137E−02 | −6.6500E−03 | 6.0600E−04 | −2.3000E−05 |
| S14 | −1.2800E−03 | 9.7500E−05 | −3.6000E−06 | 3.6500E−08 |

Table 3 shows the effective focal lengths f1-f7 of the lenses in Embodiment 1, the total effective focal length f of the optical imaging lens assembly, the total track length TTL (i.e., the distance on the optical axis from the object-side surface S1 of the first lens E1 to the image plane S15) of the optical imaging lens assembly, and the half of the diagonal length ImgH of the effective pixel area on the image plane S15 of the optical imaging lens assembly.

length ImgH of the effective pixel area on the image plane S15 of the optical imaging lens assembly satisfy: TTL/ImgH=1.46.

In Embodiment 1, the total effective focal length f of the optical imaging lens assembly and the entrance pupil diameter EPD of the optical imaging lens assembly satisfy: f/EPD=1.56. The half of the diagonal length ImgH of the effective pixel area on the image plane S15 of the optical imaging lens assembly, the total effective focal length f of the optical imaging lens assembly, and the entrance pupil diameter EPD of the optical imaging lens assembly satisfy: ImgH/(f/EPD)=2.18 mm. The maximum field-of-view FOV of the optical imaging lens assembly satisfies: FOV=78.7°.

Figures 2A, 2B:
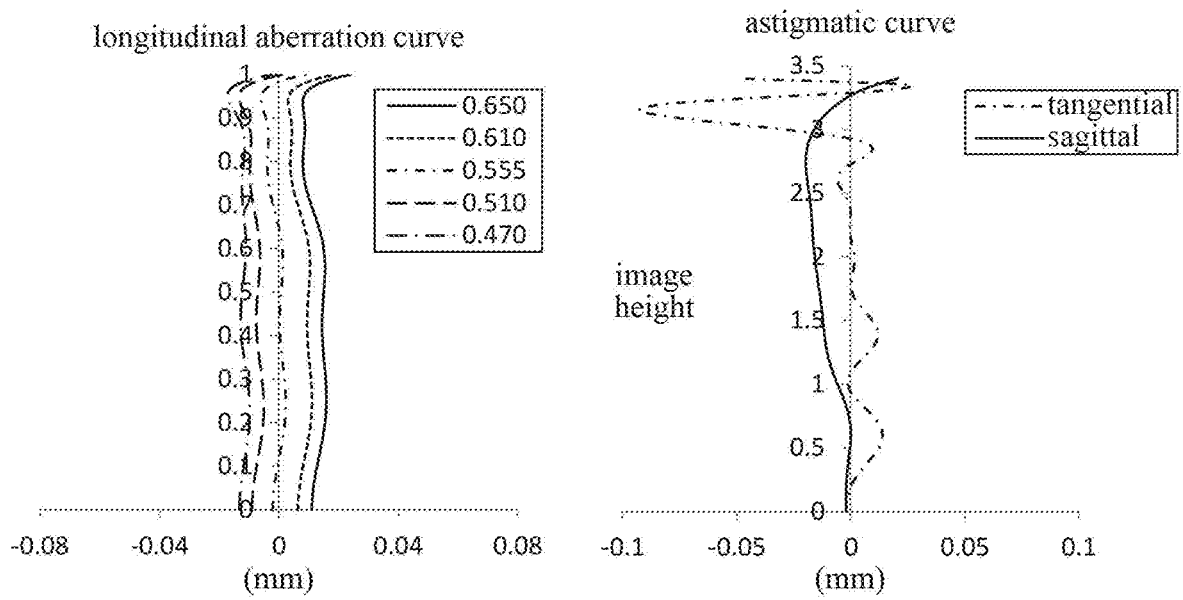
FIGS. 2A-2D respectively illustrate a longitudinal aberration curve, an astigmatic curve, a distortion curve, and a lateral color curve of the optical imaging lens assembly according to Embodiment 1.
Figures 2C, 2D:
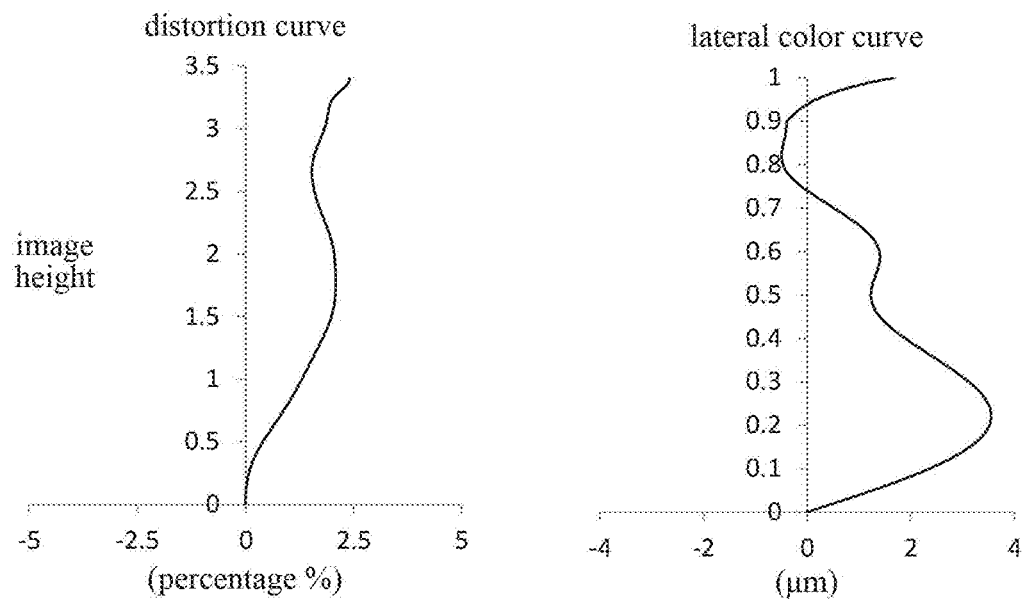

FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

Figure 3:
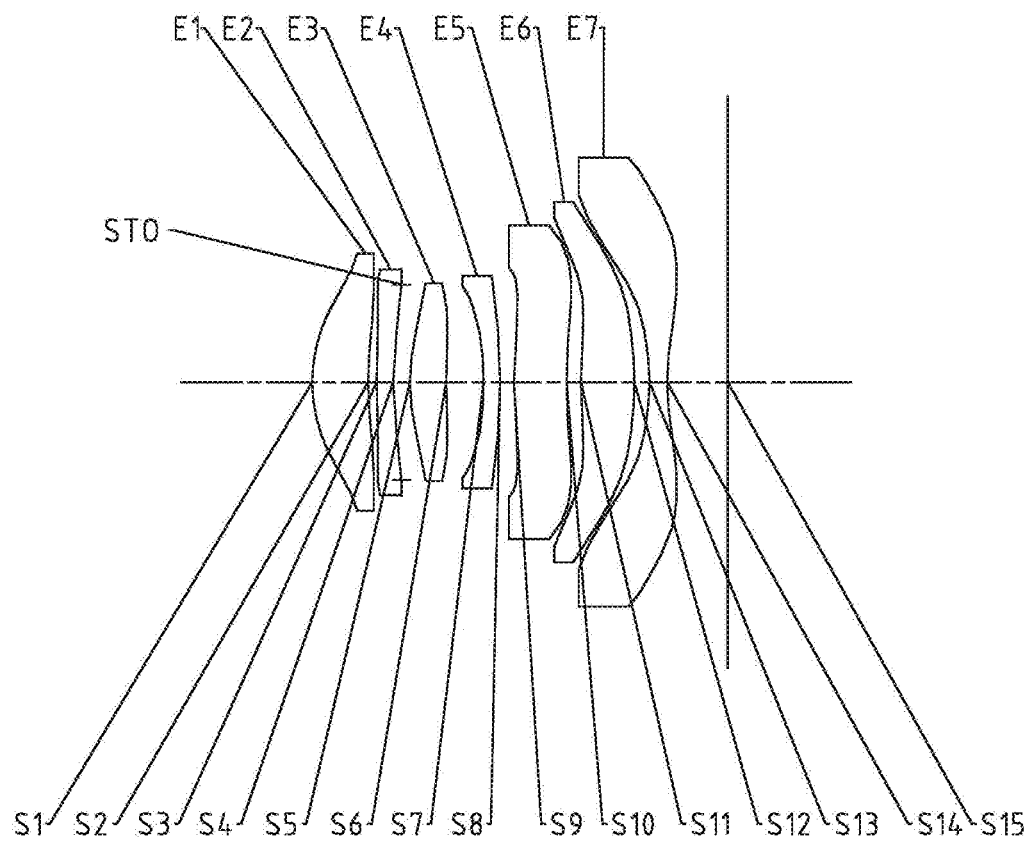
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 as a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 4 shows the surface type, the radius of curvature, the thickness, the material and the conic coefficient of each lens of the optical imaging lens assembly in Embodiment 2. The units of the radius of curvature and the thickness are both millimeters (mm). Table 5 shows the high-order coefficients applicable to each aspheric surface in Embodiment 2. The surface type of each aspheric surface may be defined by the formula (1) given in Embodiment 1. Table 6 shows the effective focal lengths f1-f7 of the lenses in Embodiment 2, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8460 | 0.6747 | 1.55 | 56.1 | 0.0644 |
| S2 | aspheric | 5.2455 | 0.1000 | | | 4.9317 |
| S3 | aspheric | 10.6222 | 0.2000 | 1.67 | 20.4 | −86.0357 |
| S4 | aspheric | 3.6320 | 0.1000 | | | −24.3242 |
| STO | spherical | infinite | 0.1000 | | | 0.0000 |
| S5 | aspheric | 2.1915 | 0.4367 | 1.55 | 56.1 | −1.3248 |
| S6 | aspheric | 8.5384 | 0.4486 | | | 7.7166 |
| S7 | aspheric | −4.9798 | 0.2000 | 1.65 | 23.5 | 10.5221 |
| S8 | aspheric | −8.6768 | 0.1668 | | | 38.3944 |
| S9 | aspheric | 8.0741 | 0.6323 | 1.55 | 56.1 | 12.8192 |
| S10 | aspheric | 7.9080 | 0.1741 | | | −52.4245 |
| S11 | aspheric | 5.7297 | 0.6412 | 1.65 | 23.5 | −45.3040 |
| S12 | aspheric | −3.8977 | 0.1825 | | | −7.0640 |
| S13 | aspheric | −2.6256 | 0.2115 | 1.54 | 55.7 | −0.0452 |
| S14 | aspheric | 3.0993 | 0.7300 | | | −15.7887 |
| S15 | spherical | infinite | | | | |

TABLE 5

| surface number | A4 | A6 | A8 | A10 | A12 |
|---|---|---|---|---|---|
| S1 | −9.2342E−03 | 5.0324E−03 | −2.6653E−02 | 2.6440E−02 | −1.7482E−02 |
| S2 | 9.7209E−03 | −8.3183E−02 | 9.0233E−02 | −1.6876E−01 | 2.1916E−01 |
| S3 | −1.4075E−02 | −4.7140E−02 | 6.8242E−02 | −1.2815E−01 | 2.1176E−01 |
| S4 | −3.1477E−02 | −2.8394E−02 | 1.2564E−01 | −3.3625E−01 | 6.3924E−01 |
| S5 | −7.2812E−02 | 1.3616E−02 | −4.6770E−02 | −3.4866E−03 | 1.3808E−01 |
| S6 | −3.7670E−02 | −6.5114E−02 | 1.7541E−01 | −6.9797E−01 | 1.5051E+00 |
| S7 | 1.3838E−02 | −4.4358E−01 | 7.2244E−01 | 4.8131E−01 | −3.6762E+00 |
| S8 | 1.4250E−01 | −9.2195E−01 | 2.2644E+00 | −3.4160E+00 | 3.4909E+00 |
| S9 | 1.4809E−01 | −5.2840E−01 | 8.3337E−01 | −8.2581E−01 | 4.5574E−01 |
| S10 | 5.0964E−02 | −8.2154E−02 | 4.6280E−02 | −1.6705E−02 | 3.5353E−03 |
| S11 | −5.3694E−02 | 5.4573E−02 | −1.3589E−01 | 1.4260E−01 | −8.1957E−02 |
| S12 | 7.6327E−03 | 1.4650E−01 | −3.3971E−01 | 2.9058E−01 | −1.2899E−01 |
| S13 | 8.7676E−02 | 2.7705E−02 | −2.7694E−01 | 3.0577E−01 | −1.6070E−01 |
| S14 | 4.1941E−02 | −1.2397E−01 | 9.6381E−02 | −4.1217E−02 | 1.0570E−02 |

| surface number | A14 | A16 | A18 | A20 |
|---|---|---|---|---|
| S1 | 6.1915E−03 | −2.0927E−03 | 7.9066E−04 | −1.3356E−04 |
| S2 | −1.4943E−01 | 5.3182E−02 | −8.8923E−03 | 4.5914E−04 |
| S3 | −1.8624E−01 | 8.6419E−02 | −2.0106E−02 | 1.8485E−03 |
| S4 | −7.2620E−01 | 4.7120E−01 | −1.6304E−01 | 2.3708E−02 |
| S5 | −2.3066E−01 | 1.9193E−01 | −7.9943E−02 | 1.3546E−02 |
| S6 | −1.8262E+00 | 1.2922E+00 | −4.9878E−01 | 8.1367E−02 |
| S7 | 6.4611E+00 | −5.7095E+00 | 2.5787E+00 | −4.7513E−01 |
| S8 | −2.2888E+00 | 8.8700E−01 | −1.7902E−01 | 1.3680E−02 |
| S9 | −6.6094E−02 | −7.1779E−02 | 4.1880E−02 | −7.1393E−03 |
| S10 | −4.7943E−04 | 1.4868E−04 | −5.3387E−05 | 6.6032E−06 |
| S11 | 2.7941E−02 | −5.5744E−03 | 5.9588E−04 | −2.6097E−05 |
| S12 | 3.2013E−02 | −4.3261E−03 | 2.7508E−04 | −4.8633E−06 |
| S13 | 4.7605E−02 | −8.1345E−03 | 7.4911E−04 | −2.8817E−05 |
| S14 | −1.6580E−03 | 1.5525E−04 | −7.9120E−06 | 1.6653E−07 |

TABLE 6

| parameter | | | | |
|---|---|---|---|---|
| f1 (mm) | f2 (mm) | f3 (mm) | f4 (mm) | f5 (mm) |
| numerical value 4.88 | −8.39 | 5.27 | −18.56 | 2043.55 |

| parameter | | | | |
|---|---|---|---|---|
| f6 (mm) | f7 (mm) | f (mm) | TTL (mm) | ImgH (mm) |
| numerical value 3.70 | −2.62 | 4.05 | 5.00 | 3.40 |

Figure 4A:
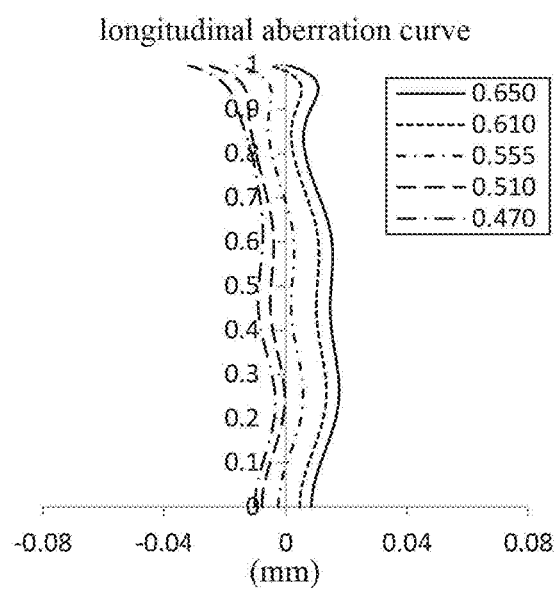
FIGS. 4A-4D respectively illustrate a longitudinal aberration curve, an astigmatic curve, a distortion curve, and a lateral color curve of the optical imaging lens assembly according to Embodiment 2.
Figure 4B:
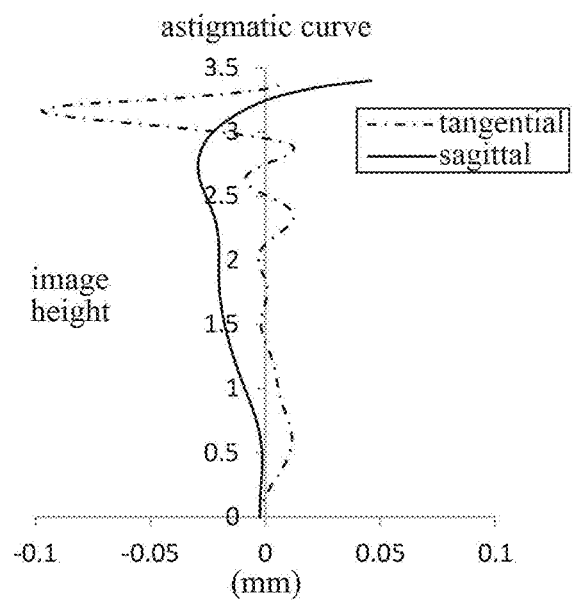
Figure 4C:
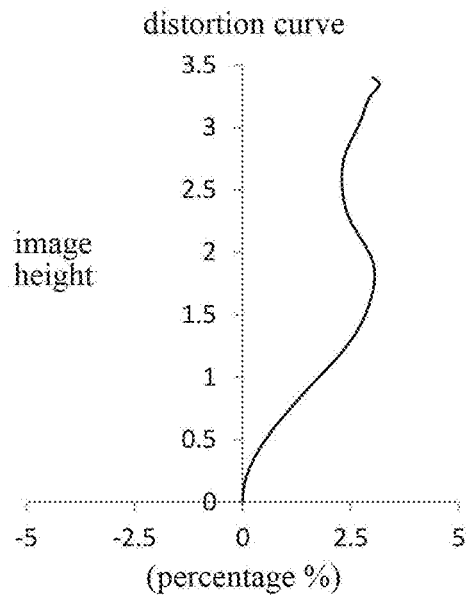
Figure 4D:
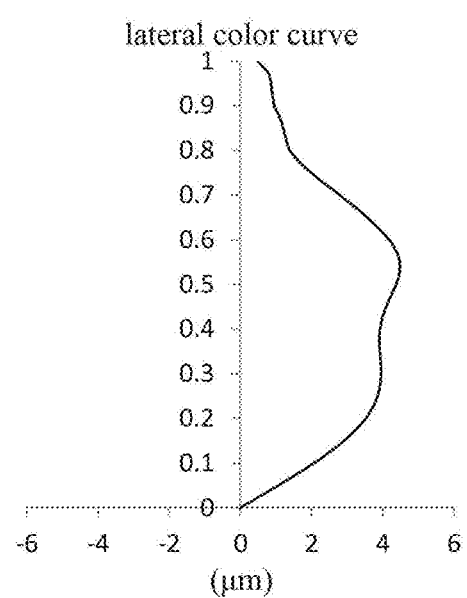

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

Figure 5:
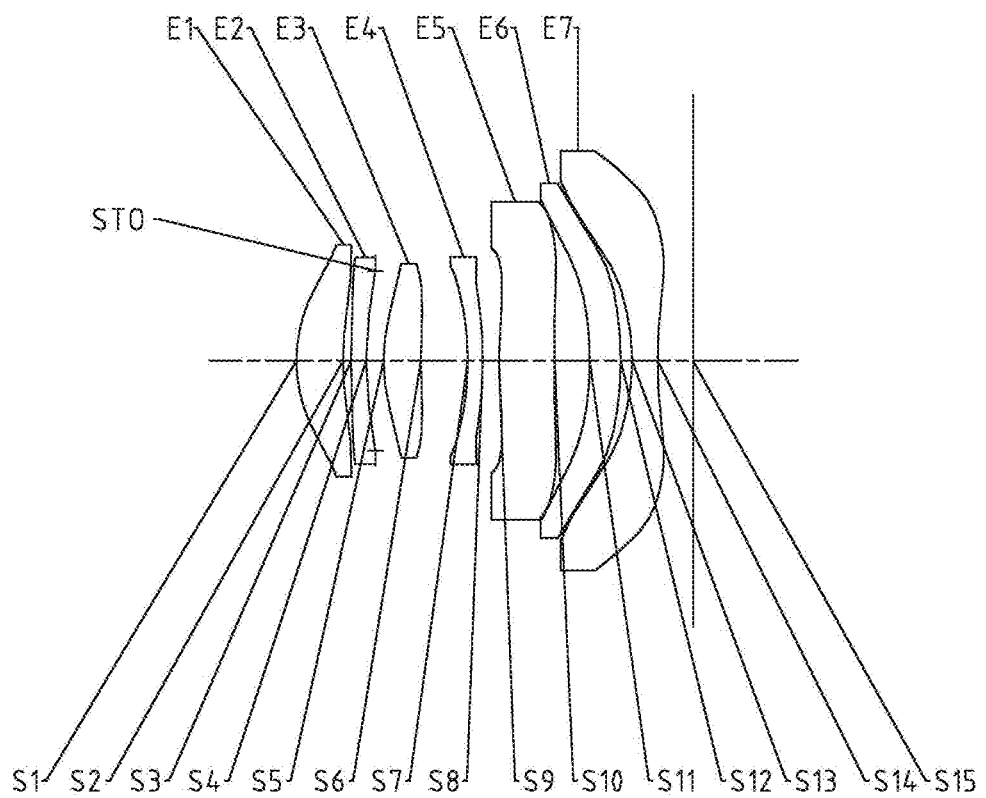
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens S7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 7 shows the surface type, the radius of curvature, the thickness, the material and the conic coefficient of each lens of the optical imaging lens assembly in Embodiment 3. The units of the radius of curvature and the thickness are both millimeters (mm). Table 8 shows the high-order coefficients applicable to each aspheric surface in Embodiment 3. The surface type of each aspheric surface may be defined by the formula (1) given in Embodiment 1. Table 9 shows the effective focal lengths f1-f7 of the lenses in Embodiment 3, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 7

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8613 | 0.5896 | 1.55 | 56.1 | −0.0658 |
| S2 | aspheric | 4.3099 | 0.1000 | | | 2.2903 |
| S3 | aspheric | 12.6161 | 0.1900 | 1.67 | 20.4 | 17.8062 |
| S4 | aspheric | 4.1000 | 0.1188 | | | −11.5083 |
| STO | spherical | infinite | 0.1000 | | | 0.0000 |
| S5 | aspheric | 2.1506 | 0.4773 | 1.55 | 56.1 | −1.1057 |
| S6 | aspheric | 10.6629 | 0.5887 | | | 61.8910 |
| S7 | aspheric | −4.7485 | 0.1900 | 1.65 | 73.5 | 5.2157 |
| S8 | aspheric | −6.7801 | 0.2030 | | | 8.8851 |
| S9 | aspheric | 6.7924 | 0.7024 | 1.55 | 56.1 | −13.5545 |
| S10 | aspheric | −19.2185 | 0.4429 | | | 38.4079 |
| S11 | aspheric | −4.8401 | 0.3906 | 1.65 | 23.5 | 1.1809 |
| S12 | aspheric | −5.7986 | 0.1443 | | | −0.7146 |
| S13 | aspheric | −2.8386 | 0.3216 | 1.54 | 55.7 | 0.0473 |
| S14 | aspheric | 7.6717 | 0.4458 | | | −99.0000 |
| S15 | spherical | infinite | | | | |

TABLE 8

| surface number | A4 | A6 | A8 | A10 | A12 |
|---|---|---|---|---|---|
| S1 | −7.7600E−03 | 2.4510E−03 | −2.4960E−02 | 3.0874E−02 | −2.2340E−02 |
| S2 | 5.4600E−03 | −2.7780E−02 | −1.4475E−01 | 4.8689E−01 | −7.9651E−01 |
| S3 | 1.5200E−03 | −4.3550E−02 | −3.2500E−02 | 3.0441E−01 | −6.1437E−01 |
| S4 | −3.3020E−02 | 2.6150E−02 | −1.5476E−01 | 6.4264E−01 | −1.3279E+00 |
| S5 | −5.0530E−02 | −4.1900E−03 | 4.5308E−02 | −1.8785E−01 | 3.7403E−01 |
| S6 | −2.9900E−02 | −4.2790E−02 | 7.0292E−02 | −2.0173E−01 | 3.5668E−01 |
| S7 | −1.0950E−02 | −3.3811E−01 | 1.0574E+00 | −1.8076E+00 | 2.0647E+00 |
| S8 | 3.5555E−02 | −4.7437E−01 | 1.2357E+00 | −1.8067E+00 | 1.8091E+00 |
| S9 | 6.2099E−02 | −2.4170E−01 | 2.9867E−01 | −2.0539E−01 | 2.4229E−02 |
| S10 | 1.0064E−01 | −9.3520E−02 | 4.2414E−02 | −8.5900E−03 | −1.5600E−03 |
| S11 | −5.6060E−02 | 1.1662E−01 | −2.1005E−01 | 2.1234E−01 | −1.2775E−01 |
| S12 | −1.7881E−01 | 4.8305E−01 | −6.4967E−01 | 4.7243E−01 | −2.0583E−01 |
| S13 | −1.1088E−01 | 4.8083E−01 | −7.3168E−01 | 5.5857E−01 | −2.4609E−01 |
| S14 | 7.4725E−02 | −6.3550E−02 | −1.8300E−03 | 1.7444E−02 | −8.2800E−03 |

| surface number | A14 | A16 | A18 | A20 |
|---|---|---|---|---|
| S1 | 7.2540E−03 | −1.1100E−03 | 1.5900E−04 | −2.6000E−05 |
| S2 | 7.3033E−01 | −3.7707E−01 | 1.0284E−01 | −1.1570E−02 |
| S3 | 6.3225E−01 | −3.5838E−01 | 1.0676E−01 | −1.3090E−02 |
| S4 | 1.5763E+00 | −1.0897E+00 | 4.0679E−01 | −6.3190E−02 |
| S5 | −4.4317E−01 | 3.1409E−01 | −1.2291E−01 | 2.0656E−02 |
| S6 | −3.9277E−01 | 2.6684E−01 | −1.0315E−01 | 1.7393E−02 |
| S7 | −1.4689E+00 | 5.7127E−01 | −9.3030E−02 | −3.0000E−05 |
| S8 | −1.1697E+00 | 4.4414E−01 | −8.7100E−02 | 6.4360E−03 |
| S9 | 8.9325E−02 | −8.1090E−02 | 3.0427E−02 | −4.4300E−03 |
| S10 | 1.2740E−03 | −2.6000E−04 | 1.7200E−05 | 0.0000E+00 |
| S11 | 4.7065E−02 | −1.0380E−02 | 1.2560E−03 | −6.4000E−05 |
| S12 | 5.5700E−02 | −9.2000E−03 | 8.5000E−04 | −3.4000E−05 |
| S13 | 6.5687E−02 | −1.0510E−02 | 9.2800E−04 | −3.5000E−05 |
| S14 | 1.9170E−03 | −2.5000E−04 | 1.7500E−05 | −5.2000E−07 |

TABLE 9

| | parameter | | | | |
|---|---|---|---|---|---|
| | f1 (mm) | f2 (mm) | f3 (mm) | f4 (mm) | f5 (mm) |
| numerical value | 5.53 | −9.21 | 4.84 | −25.56 | 9.28 |

| | parameter | | | | |
|---|---|---|---|---|---|
| | f6 (mm) | f7 (mm) | f (mm) | TTL (mm) | ImgH (mm) |
| numerical value | −54.14 | −3.82 | 4.19 | 5.00 | 3.34 |

Figure 6A:
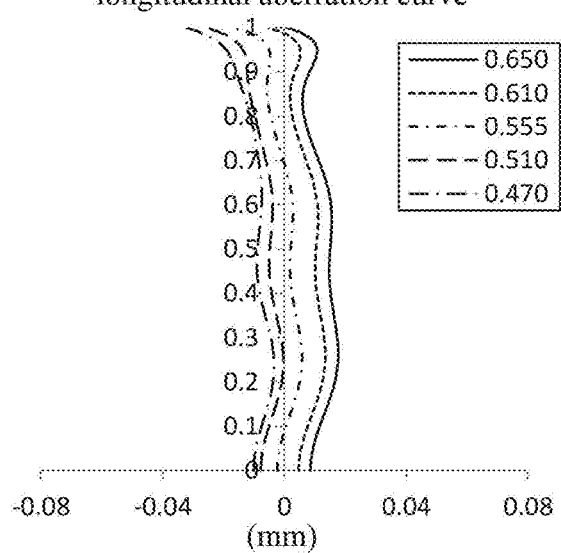
FIGS. 6A-6D respectively illustrate a longitudinal aberration curve, an astigmatic curve, a distortion curve, and a lateral color curve of the optical imaging lens assembly according to Embodiment 3.
Figure 6B:
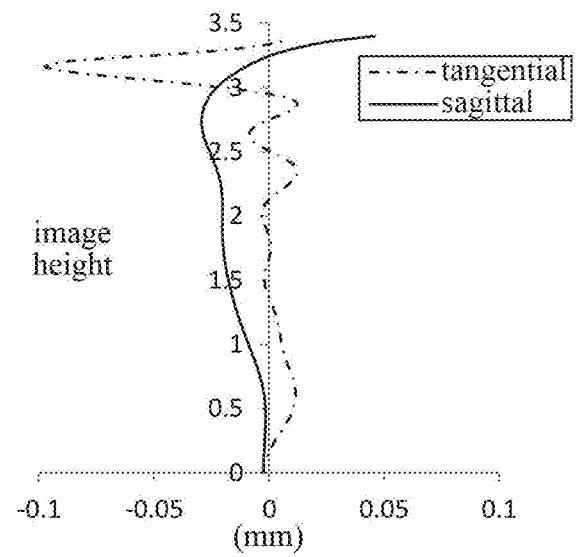
Figure 6C:
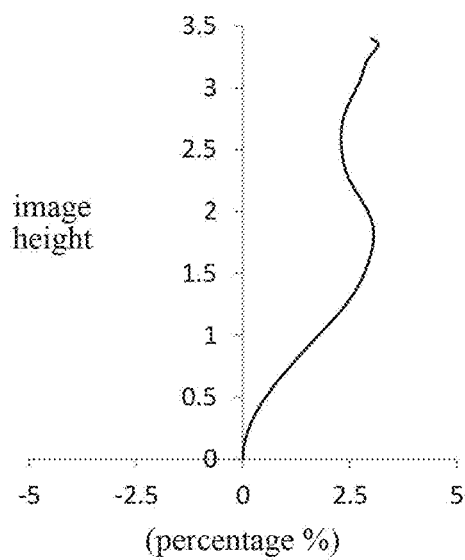
Figure 6D:
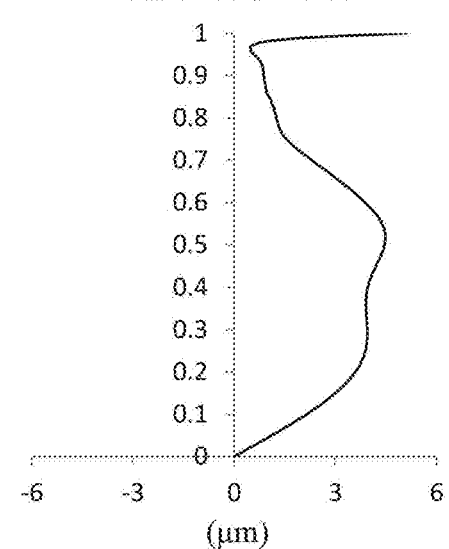

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

Figure 7:
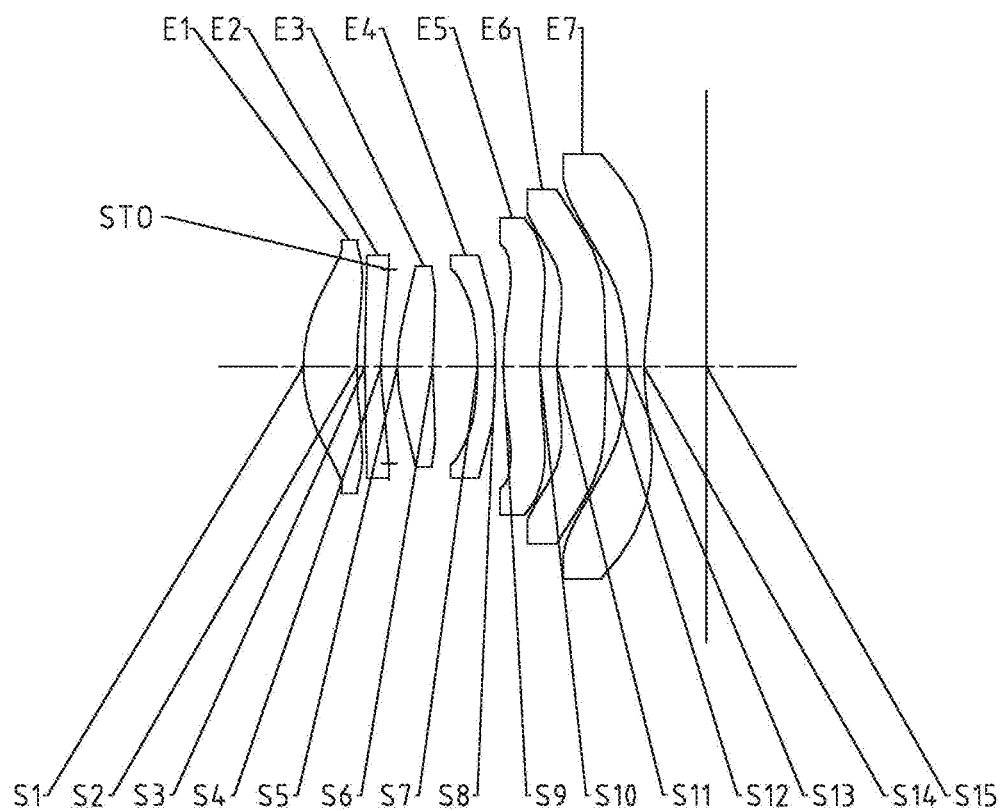
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a negative refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 10 shows the surface type, the radius of curvature, the thickness, the material and the conic coefficient of each lens of the optical imaging lens assembly in Embodiment 4. The units of the radius of curvature and the thickness are both millimeters (mm). Table 11 shows the high-order coefficients applicable to each aspheric surface in Embodiment 4. The surface type of each aspheric surface may be defined by the formula (1) given in Embodiment 1. Table 12 shows the effective focal lengths f1-f7 of the lenses in Embodiment 4, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 10

| surface number | surface type | radius of curvature | thickness | material | | conic coefficient |
|---|---|---|---|---|---|---|
| | | | | refractive index | abbe number | |
| OBJ | spherical | infinite | infinite | | | |
| S1 | aspheric | 1.9213 | 0.6593 | 1.55 | 56.1 | 0.0712 |
| S2 | aspheric | 4.9906 | 0.1000 | | | 2.5319 |
| S3 | aspheric | 7.6168 | 0.2000 | 1.67 | 20.4 | −89.1924 |
| S4 | aspheric | 3.2000 | 0.1000 | | | −24.4014 |
| STO | spherical | infinite | 0.1000 | | | 0.0000 |
| S5 | aspheric | 2.1143 | 0.4373 | 1.55 | 56.1 | −0.9842 |
| S6 | aspheric | 7.3283 | 0.5549 | | | 19.2883 |
| S7 | aspheric | −4.9629 | 0.2181 | 1.65 | 23.5 | 13.5457 |
| S8 | aspheric | −8.8582 | 0.1000 | | | 36.0260 |

TABLE 10-continued

| surface number | surface type | radius of curvature | thickness | material refractive index | abbe number | conic coefficient |
|---|---|---|---|---|---|---|
| S9 | aspheric | 5.0972 | 0.4500 | 1.55 | 56.1 | 5.2644 |
| S10 | aspheric | 3.9062 | 0.2120 | | | −99.0000 |
| S11 | aspheric | 3.0112 | 0.6086 | 1.65 | 23.5 | −22.1905 |
| S12 | aspheric | −5.9377 | 0.2671 | | | −11.0175 |
| S13 | aspheric | −2.7856 | 0.2000 | 1.54 | 55.7 | −0.0405 |
| S14 | aspheric | 2.6859 | 0.7700 | | | −34.1655 |
| S15 | spherical | infinite | | | | |

TABLE 11

| surface number | A4 | A6 | A8 | A10 | A12 |
|---|---|---|---|---|---|
| S1 | −1.0419E−02 | 6.5800E−03 | −2.4280E−02 | 1.7703E−02 | −5.1589E−03 |
| S2 | 8.0457E−03 | −7.3600E−02 | 9.3041E−02 | −1.9220E−01 | 2.4878E−01 |
| S3 | −1.2298E−02 | −4.9882E−02 | 7.4272E−02 | −1.5806E−01 | 2.5533E−01 |
| S4 | −9.8702E−03 | −8.4078E−02 | 2.1831E−01 | −5.1098E−01 | 8.7583E−01 |
| S5 | −5.1258E−02 | 1.4058E−02 | −8.9672E−02 | 1.4355E−01 | −1.5358E−01 |
| S6 | −6.1892E−03 | −7.3818E−02 | 2.1874E−01 | −7.0045E−01 | 1.2133E+00 |
| S7 | 4.7062E−02 | −4.3064E−01 | 5.0438E−01 | 6.1294E−01 | −3.0180E+00 |
| S8 | 2.2861E−01 | −1.0989E+00 | 2.0886E+00 | −2.4896E+00 | 1.8336E+00 |
| S9 | 1.7894E−01 | −5.9524E−01 | 9.9900E−01 | −1.1907E−00 | 9.6266E−01 |
| S10 | 1.3810E−02 | −3.1570E−02 | 4.7300E−02 | −7.7242E−02 | 6.5563E−02 |
| S11 | −4.9424E−02 | 6.3895E−02 | −2.1821E−01 | 2.4874E−01 | −1.5232E−01 |
| S12 | 1.4014E−01 | −7.6661E−02 | −9.6563E−02 | 1.1772E−01 | −5.2584E−02 |
| S13 | 1.1004E−01 | −4.7397E−02 | −1.5339E−01 | 1.9918E−01 | −1.0774E−01 |
| S14 | 6.6361E−02 | −1.6204E−01 | 1.2178E−01 | −5.0787E−02 | 1.2846E−02 |

| surface number | A14 | A16 | A18 | A20 |
|---|---|---|---|---|
| S1 | 3.4011E−03 | 2.8552E−03 | −7.8159E−04 | 7.9070E−05 |
| S2 | −1.7606E−01 | 6.9797E−02 | −1.4737E−02 | 1.2977E−03 |
| S3 | −2.2413E−01 | 1.0811E−01 | −2.7340E−02 | 2.8682E−03 |
| S4 | −9.2974E−01 | 5.8082E−01 | −1.9695E−01 | 2.8178E−02 |
| S5 | 8.1286E−02 | 2.6488E−03 | −1.7449E−02 | 4.5141E−03 |
| S6 | −1.2646E+00 | 8.0457E−01 | −2.8501E−01 | 4.2772E−02 |
| S7 | 4.5984E+00 | −3.5509E+00 | 1.4032E+00 | −2.2735E−01 |
| S8 | −7.1091E−01 | 8.2584E−02 | 2.5102E−02 | −6.1091E−03 |
| S9 | −5.0943E−01 | 1.6862E−01 | −3.1616E−02 | 2.5367E−03 |
| S10 | −3.1424E−02 | 8.9212E−03 | −1.4217E−03 | 9.8258E−05 |
| S11 | 5.4305E−02 | −1.0915E−02 | 1.0980E−03 | −3.9223E−05 |
| S12 | 1.1344E−02 | −1.0172E−03 | −1.0025E−05 | 5.1771E−06 |
| S13 | 3.1855E−02 | −5.3700E−03 | 4.8533E−04 | −1.8277E−05 |
| S14 | −1.9989E−03 | 1.8491E−04 | −9.1732E−06 | 1.8270E−07 |

TABLE 12

| parameter | | | | |
|---|---|---|---|---|
| f1 (mm) | f2 (mm) | f3 (mm) | f4 (mm) | f5 (mm) |

| numerical value | 5.32 | −8.44 | 5.29 | −17.93 | −35.34 |

| parameter | | | | |
|---|---|---|---|---|
| f6 (mm) | f7 (mm) | f (mm) | TTL (mm) | ImgH (mm) |

| numerical value | 3.19 | −2.52 | 4.05 | 4.98 | 3.40 |

Figure 8A:
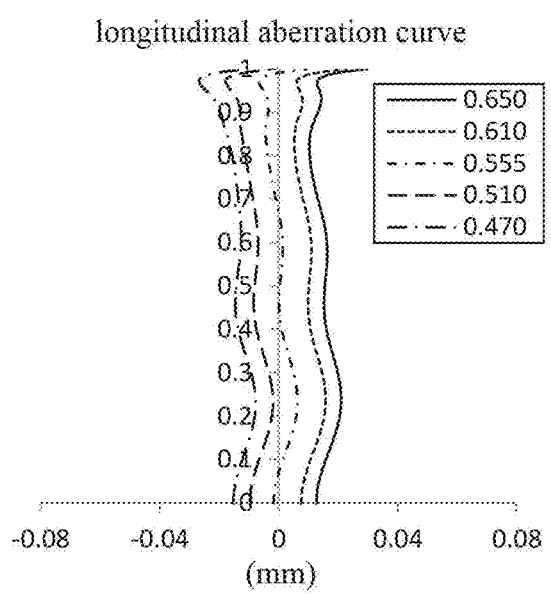
FIGS. 8A-8D respectively illustrate a longitudinal aberration curve, an astigmatic curve, a distortion curve, and a lateral color curve of the optical imaging lens assembly according to Embodiment 4.
Figure 8B:
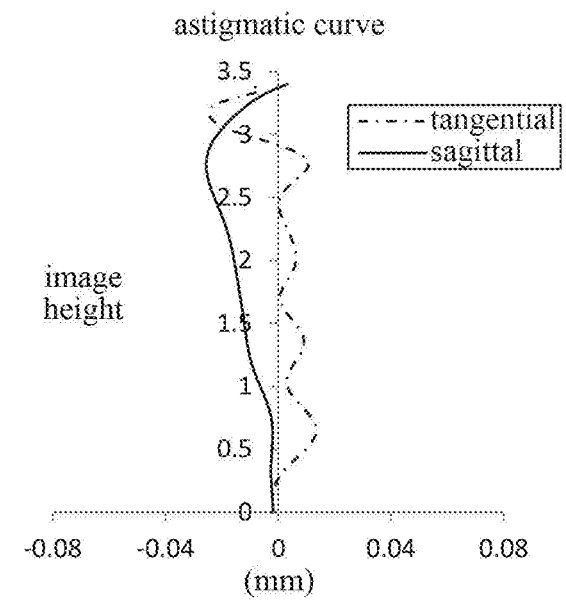
Figure 8C:
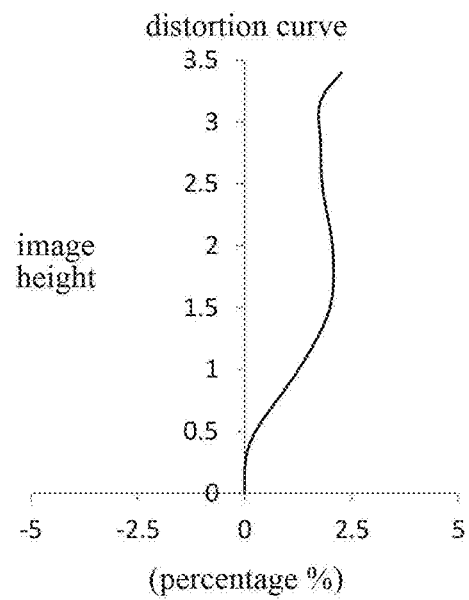
Figure 8D:
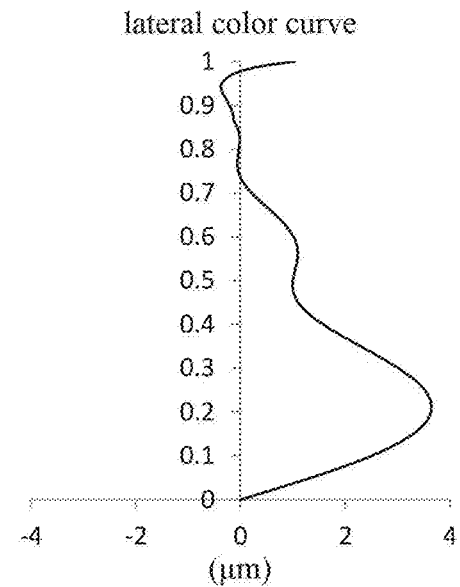

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

Figure 9:
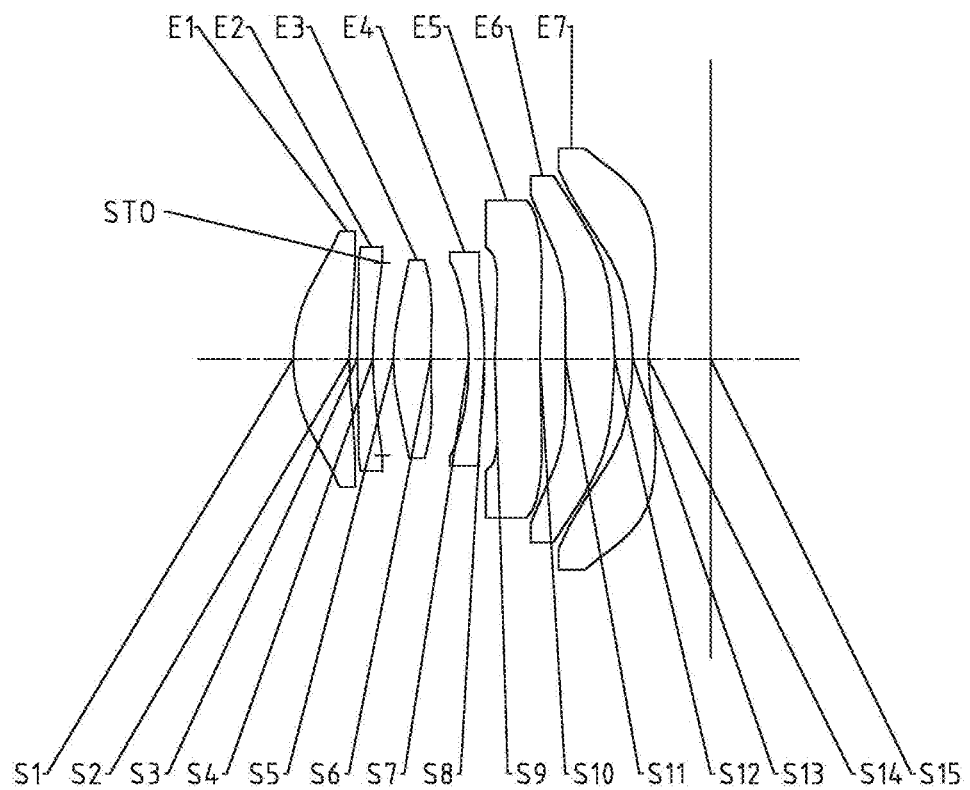
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 13 shows the surface type, the radius of curvature, the thickness, the material and the conic coefficient of each lens of the optical imaging lens assembly in Embodiment 5. The units of the radius of curvature and the thickness are both millimeters (mm). Table 14 shows the high-order coefficients applicable to each aspheric surface in Embodiment 5. The surface type of each aspheric surface may be defined by the formula (1) given in Embodiment 1. Table 15 shows the effective focal lengths f1-f7 of the lenses in Embodiment 5, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9896 | 0.7196 | 1.55 | 56.1 | 0.0431 |
| S2 | aspheric | 5.8505 | 0.1027 | | | 5.3344 |
| S3 | aspheric | 10.8692 | 0.2000 | 1.67 | 20.4 | −84.4626 |
| S4 | aspheric | 3.8866 | 0.1231 | | | −18.5399 |
| STO | spherical | infinite | 0.1395 | | | 0.0000 |
| S5 | aspheric | 2.4129 | 0.4815 | 1.55 | 56.1 | −1.2239 |
| S6 | aspheric | 10.4128 | 0.4881 | | | −23.9809 |
| S7 | aspheric | −5.2095 | 0.2000 | 1.65 | 23.5 | 7.6419 |
| S8 | aspheric | −10.6063 | 0.1333 | | | 36.9566 |
| S9 | aspheric | 8.5102 | 0.5800 | 1.55 | 56.1 | 5.4515 |
| S10 | aspheric | 65.9739 | 0.3264 | | | −99.0000 |
| S11 | aspheric | 39.2931 | 0.6345 | 1.65 | 23.5 | −99.0000 |
| S12 | aspheric | −4.4366 | 0.2311 | | | −7.1246 |
| S13 | aspheric | −2.8646 | 0.2000 | 1.54 | 55.7 | −0.0362 |
| S14 | aspheric | 3.4241 | 0.8000 | | | −40.7227 |
| S15 | spherical | infinite | | | | |

TABLE 14

| surface number | A4 | A6 | A8 | A10 | A12 |
|---|---|---|---|---|---|
| S1 | −6.8700E−03 | 3.3600E−04 | −1.1530E−02 | 1.2669E−02 | −1.0960E−02 |
| S2 | 5.7950E−03 | −4.3670E−02 | 2.4641E−02 | −3.4710E−02 | 3.5528E−02 |
| S3 | −1.1390E−02 | −2.8020E−02 | 3.4211E−02 | −5.1170E−02 | 6.7762E−02 |
| S4 | −2.7900E−02 | −3.7500E−03 | 4.0157E−02 | −1.0326E−01 | 1.8938E−01 |
| S5 | −4.6970E−02 | −6.0700E−03 | 1.6768E−02 | −8.8120E−02 | 1.7587E−01 |
| S6 | −2.9810E−02 | −5.2430E−02 | 1.4020E−01 | −4.6000E−01 | 8.6196E−01 |
| S7 | −2.8790E−02 | −1.8866E−01 | 5.0135E−01 | −6.1953E−01 | 3.5927E−01 |
| S8 | 4.0967E−02 | −4.3630E−01 | 1.1000E+00 | −1.6356E+00 | 1.6619E+00 |
| S9 | 8.2698E−02 | −3.4261E−01 | 5.8739E−01 | −6.8061E−01 | 5.1102E−01 |
| S10 | 4.5791E−02 | −5.0820E−02 | 2.3003E−02 | −5.2200E−03 | −2.6000E−04 |
| S11 | −5.0920E−02 | 5.4450E−02 | −1.1251E−01 | 1.0679E−01 | −5.6370E−02 |
| S12 | 3.8418E−02 | 4.6604E−02 | −1.4856E−01 | 1.1897E−01 | −4.8300E−02 |
| S13 | 5.0084E−02 | 7.6963E−02 | −2.3414E−01 | 2.0178E−01 | −8.8630E−02 |
| S14 | 4.2057E−02 | −8.2750E−02 | 4.6486E−02 | 1.3300E−02 | 1.7670E−03 |

| surface number | A14 | A16 | A18 | A20 |
|---|---|---|---|---|
| S1 | 6.2310E−03 | −2.6000E−03 | 6.8400E−04 | −7.7000E−05 |
| S2 | −1.3600E−02 | −2.7000E−04 | 1.3940E−03 | −2.5000E−04 |
| S3 | −4.8050E−02 | 1.7940E−02 | −3.3200E−03 | 2.4300E−04 |
| S4 | −2.0285E−01 | 1.2383E−01 | −4.0730E−02 | 5.7300E−03 |

TABLE 14-continued

| | | | | |
|---|---|---|---|---|
| S5 | −1.9387E−01 | 1.2579E−01 | 4.4360E−02 | 6.7070E−03 |
| S6 | −9.4164E−01 | 6.0560E−01 | −2.1291E−01 | 3.1672E−02 |
| S7 | 1.0485E−01 | −2.9494E−01 | 1.6237E−01 | −3.0460E−02 |
| S8 | −1.0938E+00 | 4.3444E−01 | −9.4090E−02 | 8.5150E−03 |
| S9 | −2.2987E−01 | 5.0214E−02 | −5.6000E−04 | −1.2400E−03 |
| S10 | 5.7300E−04 | −1.7000E−04 | 2.2500E−05 | −1.2000E−06 |
| S11 | 1.7785E−02 | −3.3100E−03 | 3.3400E−04 | −1.4000E−05 |
| S12 | 1.1247E−02 | −1.5200E−03 | 1.1000E−04 | −3.3000E−06 |
| S13 | 2.2431E−02 | −3.3100E−03 | 2.6600E−04 | −9.0000E−06 |
| S14 | 1.3500E−05 | −3.7000E−05 | 4.5500E−06 | −1.8000E−07 |

TABLE 15

| | parameter | | | | |
|---|---|---|---|---|---|
| | f1 (mm) | f2 (mm) | f3 (mm) | f4 (mm) | f5 (mm) |
| numerical value | 5.18 | −9.19 | 5.63 | −16.15 | 17.83 |

| | parameter | | | |
|---|---|---|---|---|
| | f6 (mm) | f7 (mm) | f (mm) | TTL (mm) | ImgH (mm) |
| numerical value | 6.23 | −2.87 | 4.56 | 5.36 | 3.80 |

Figures 10A, 10B:
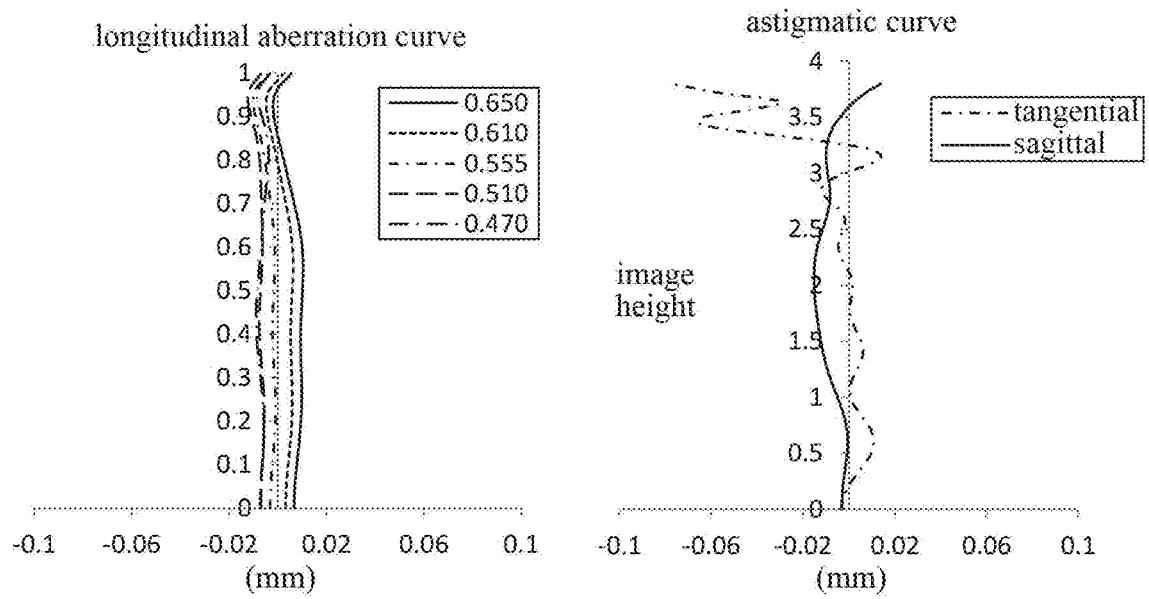
FIGS. 10A-10D respectively illustrate a longitudinal aberration curve, an astigmatic curve, a distortion curve, and a lateral color curve of the optical imaging lens assembly according to Embodiment 5.
Figures 10C, 10D:
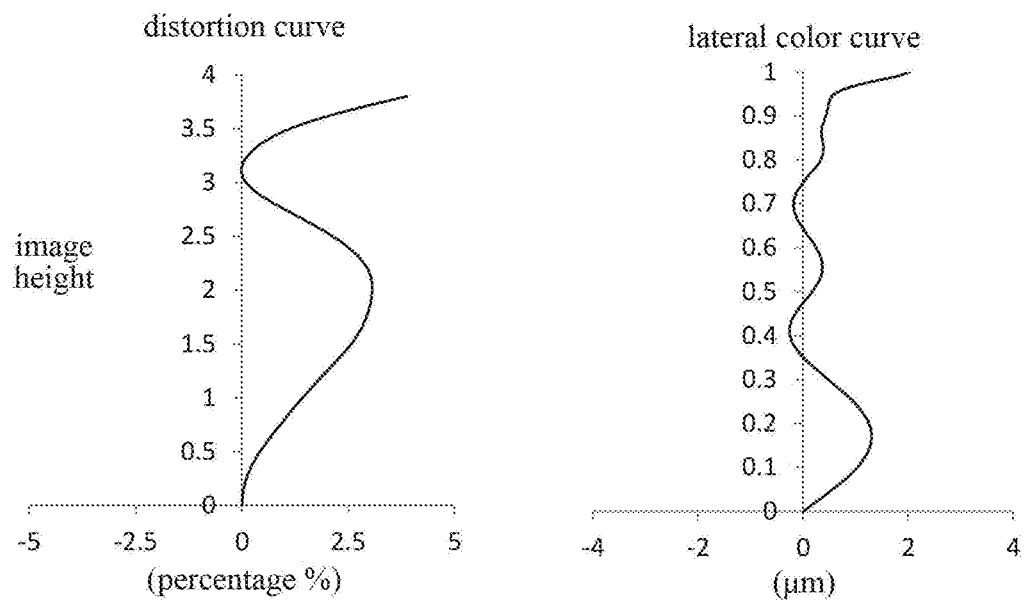

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
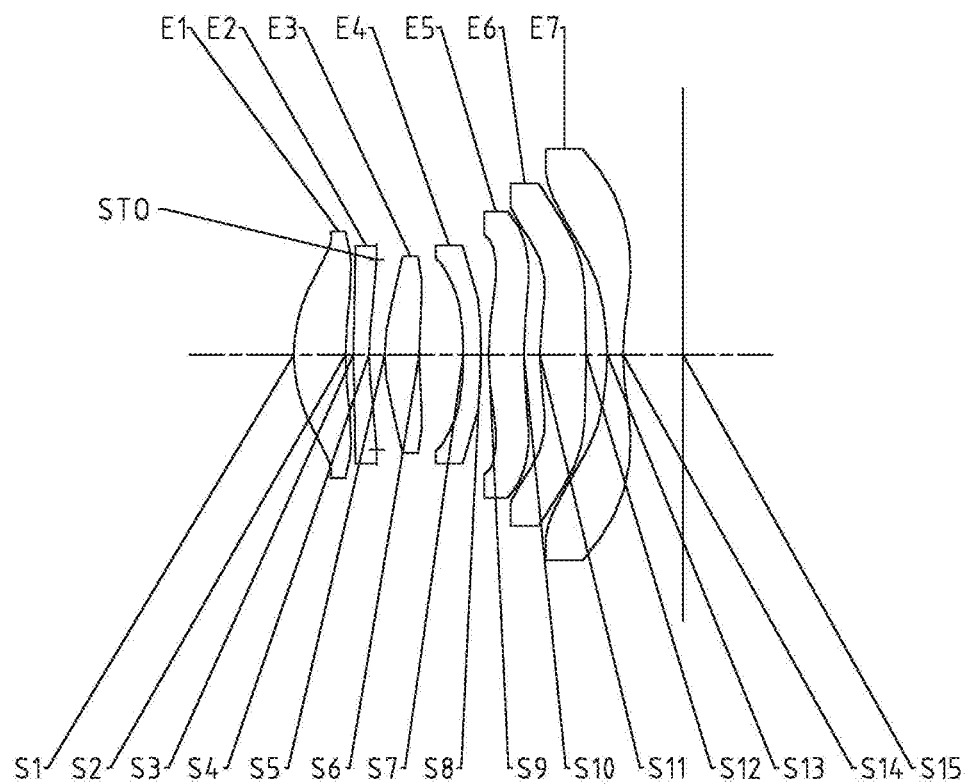
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 or the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a negative refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 16 shows the surface type, the radius of curvature, the thickness, the material and the conic coefficient of each lens of the optical imaging lens assembly in Embodiment 6. The units of the radius of curvature and the thickness are both millimeters (mm). Table 17 shows the high-order coefficients applicable to each aspheric surface in Embodiment 6. The surface type of each aspheric surface may be defined by the formula (1) given in Embodiment 1. Table 18 shows the effective focal lengths f1-f7 of the lenses in Embodiment 6, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 16

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9297 | 0.6658 | 1.55 | 56.1 | 0.0788 |
| S2 | aspheric | 4.9043 | 0.1000 | | | 2.3295 |
| S3 | aspheric | 7.4570 | 0.2000 | 1.67 | 20.4 | −86.1242 |
| S4 | aspheric | 3.1935 | 0.1003 | | | −24.3875 |
| STO | spherical | infinite | 0.1000 | | | 0.0000 |
| S5 | aspheric | 2.1124 | 0.4439 | 1.55 | 56.1 | −1.0115 |
| S6 | aspheric | 7.2655 | 0.5661 | | | 19.0546 |
| S7 | aspheric | −4.8884 | 0.2259 | 1.65 | 23.5 | 14.3465 |
| S8 | aspheric | −8.6515 | 0.1000 | | | 34.8790 |
| S9 | aspheric | 4.9836 | 0.4500 | 1.55 | 56.1 | 4.8332 |
| S10 | aspheric | 3.9044 | 0.2053 | | | −98.9134 |
| S11 | aspheric | 2.9545 | 0.5966 | 1.65 | 23.5 | −21.3390 |
| S12 | aspheric | −6.3039 | 0.2701 | | | −10.5306 |
| S13 | aspheric | −2.8163 | 0.2000 | 1.54 | 55.7 | −0.0419 |
| S14 | aspheric | 2.7161 | 0.7700 | | | −34.3123 |
| S15 | spherical | infinite | | | | |

TABLE 17

| surface number | A4 | A6 | A8 | A10 | A12 |
|---|---|---|---|---|---|
| S1 | 1.0537E−02 | 6.8724E−03 | −2.4557E−02 | 1.8127E−02 | −5.7261E−03 |
| S2 | 8.1196E−03 | −7.3777E−02 | 9.1975E−02 | −1.8870E−01 | 2.4311E−01 |
| S3 | −1.1904E−02 | −4.9548E−02 | 7.2705E−02 | −1.5501E−01 | 2.4975E−01 |
| S4 | −9.7951E−03 | −8.2367E−02 | 2.1299E−01 | −4.9242E−01 | 8.3103E−01 |
| S5 | −5.1276E−02 | 1.7244E−02 | −9.7372E−02 | 1.6591E−01 | −1.9872E−01 |
| S6 | −5.1616E−03 | −6.8964E−02 | 1.8083E−01 | −5.4436E−01 | 8.7532E−01 |
| S7 | 4.5537E−02 | −4.0769E−01 | 4.9886E−01 | 3.7944E−01 | −2.2548E+00 |
| S8 | 2.1792E−01 | −1.0222E+00 | 1.8150E+00 | −1.9647E+00 | 1.2306E+00 |
| S9 | 1.7827E−01 | −5.7499E−01 | 9.2229E−01 | −1.0580E+00 | 8.2800E−01 |
| S10 | 1.4987E−02 | −3.3383E−02 | 4.9612E−02 | −8.3250E−02 | 7.1800E−02 |
| S11 | −4.9439E−02 | 6.2581E−02 | −2.1653E−01 | 2.4613E−01 | −1.4973E−01 |
| S12 | 1.4036E−01 | −7.9810E−02 | −9.1660E−02 | 1.1465E−01 | −5.1740E−02 |
| S13 | 1.1383E−01 | −6.5186E−02 | −1.2238E−01 | 1.7185E−01 | −9.4079E−02 |
| S14 | 6.8503E−02 | −1.6551E−01 | 1.2535E−01 | −5.2976E−02 | 1.3644E−02 |

| surface number | A14 | A16 | A18 | A20 |
|---|---|---|---|---|
| S1 | −2.6661E−03 | 2.3740E−03 | −6.2774E−04 | 5.9655E−05 |
| S2 | −1.7096E−02 | 6.7207E−02 | −1.4035E−02 | 1.2186E−03 |
| S3 | −2.1790E−01 | 1.0417E−01 | −2.6056E−02 | 2.6984E−03 |
| S4 | −8.6746E−01 | 5.3132E−01 | −1.7610E−01 | 2.4559E−02 |
| S5 | 1.3850E−01 | −4.3740E−02 | 3.5962E−03 | 5.4649E−04 |
| S6 | −8.4744E−01 | 5.0451E−01 | −1.6782E−01 | 2.3587E−02 |
| S7 | 3.4212E+00 | −2.5673E+00 | 9.7675E−01 | −1.5169E−01 |
| S8 | −2.9928E−01 | −7.8105E−02 | 5.7869E−02 | −8.7873E−03 |
| S9 | −4.2500E−01 | 1.3656E−01 | −2.4893E−02 | 1.9445E−03 |
| S10 | −3.4734E−02 | 9.9092E−03 | −1.5820E−03 | 1.0940E−04 |
| S11 | 5.2764E−02 | −1.0383E−02 | 1.0009E−03 | −3.1974E−05 |
| S12 | 1.1311E−02 | −1.0542E−03 | −1.7754E−06 | 4.6238E−06 |
| S13 | 2.7797E−02 | −4.6615E−03 | 4.1821E−04 | −1.5617E−05 |
| S14 | −2.1718E−03 | 2.0680E−04 | −1.0667E−05 | 2.2506E−07 |

TABLE 18

| parameter | | | | |
|---|---|---|---|---|
| f1 (mm) | f2 (mm) | f3 (mm) | f4 (mm) | f5 (mm) |
| numerical value 5.40 | −8.55 | 5.29 | −17.89 | −38.73 |

| parameter | | | | |
|---|---|---|---|---|
| f6 (mm) | f7 (mm) | f (mm) | TTL (mm) | ImgH (mm) |
| numerical value 3.21 | −2.54 | 4.05 | 4.99 | 3.40 |

Figure 12A:
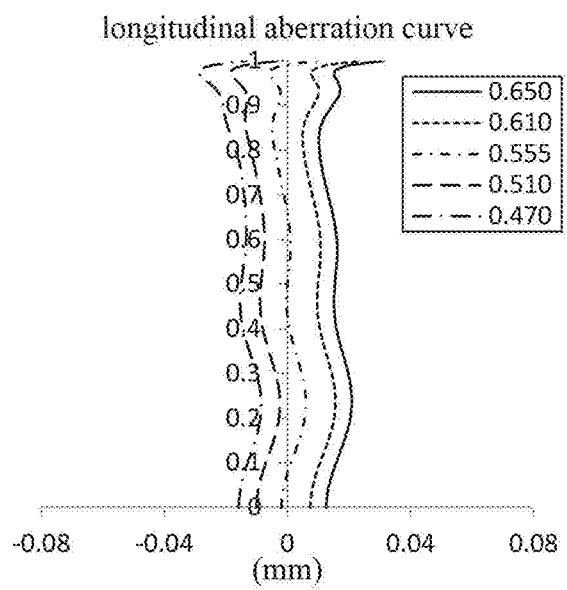
FIGS. 12A-12D respectively illustrate a longitudinal aberration curve, an astigmatic curve, a distortion curve, and a lateral color curve of the optical imaging lens assembly according to Embodiment 6.
Figure 12B:
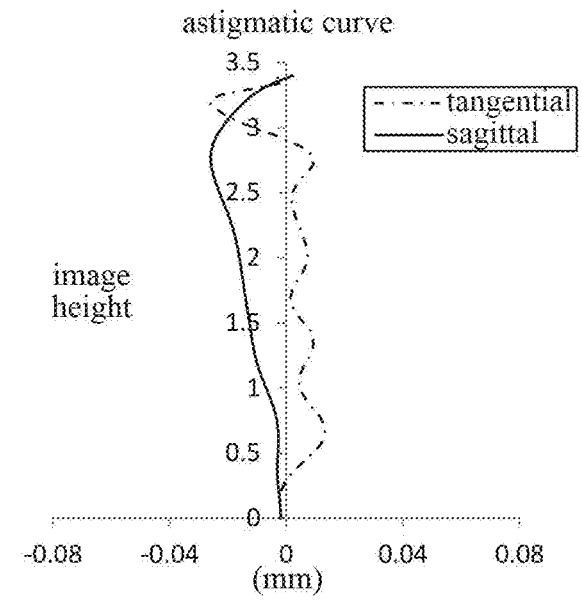
Figure 12C:
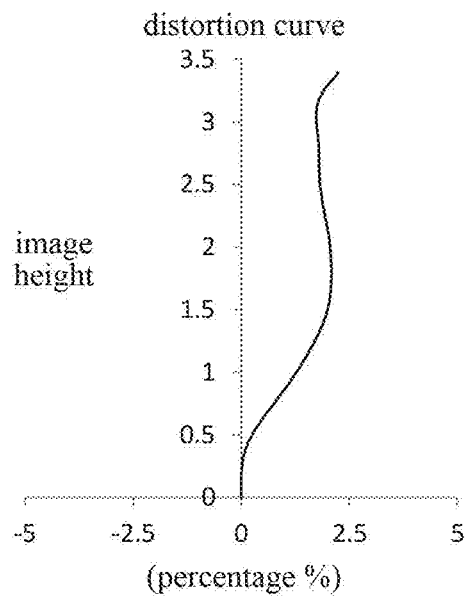
Figure 12D:
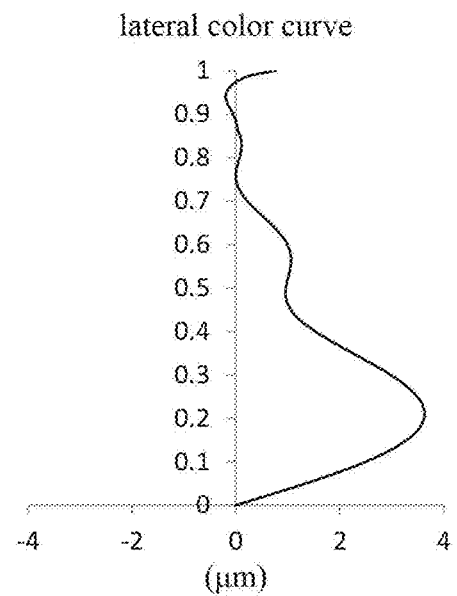

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

Figure 13:
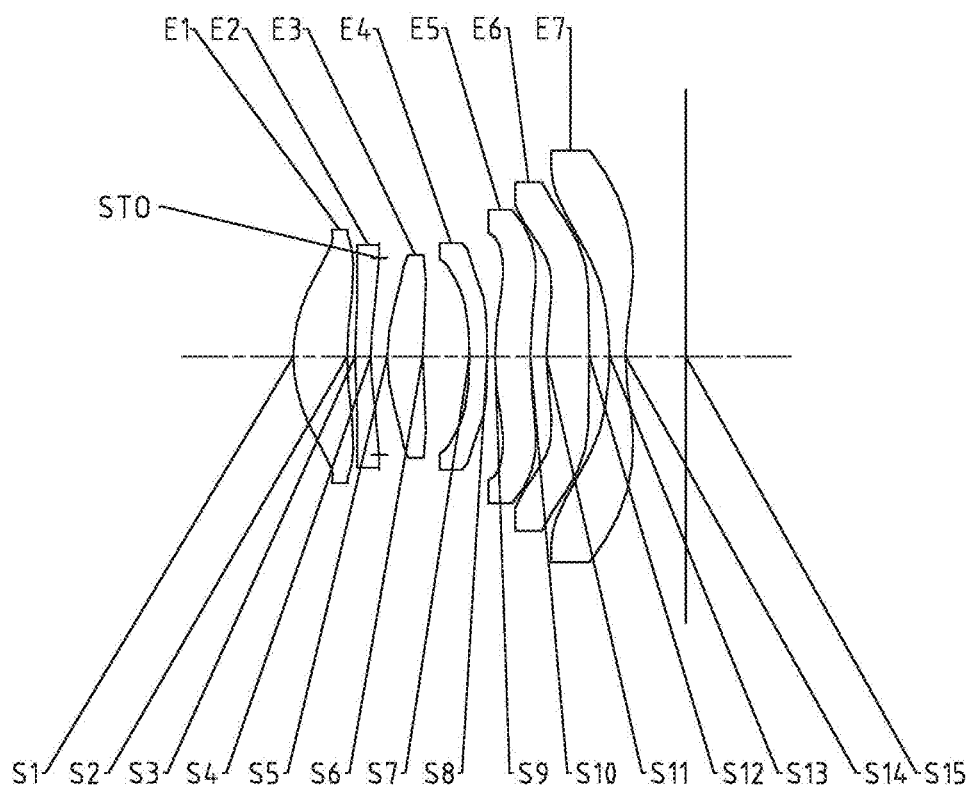
FIG. 13 is a schematic structural diagram illustrating an optical imaging lens assembly according to Embodiment 7 of the present disclosure.

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly includes, sequentially along an optical axis from an object side to an image side, a first lens E1, a second lens E2, a third lens E3, a fourth lens E4, a fifth lens E5, a sixth lens S6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a negative refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 19 shows the surface type, the radius of curvature, the thickness, the material and the conic coefficient of each lens of the optical imaging lens assembly in Embodiment 7. The units of the radius of curvature and the thickness are both millimeters (mm). Table 20 shows the high-order coefficients applicable to each aspheric surface in Embodiment 7. The surface type of each aspheric surface may be defined by the formula (1) given in Embodiment 1. Table 21 shows the effective focal lengths f1-f7 of the lenses in Embodiment 7, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 19

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9316 | 0.6871 | 1.55 | 56.1 | 0.0950 |
| S2 | aspheric | 4.5263 | 0.1000 | | | 1.4750 |
| S3 | aspheric | 6.3229 | 0.2000 | 1.67 | 20.4 | −80.5551 |
| S4 | aspheric | 3.0207 | 0.1093 | | | −24.0266 |
| STO | spherical | infinite | 0.1000 | | | 0.0000 |
| S5 | aspheric | 2.0615 | 0.4527 | 1.55 | 56.1 | −0.9291 |
| S6 | aspheric | 6.7407 | 0.5950 | | | 19.8332 |
| S7 | aspheric | −4.9055 | 0.2256 | 1.65 | 23.5 | 14.6030 |
| S8 | aspheric | −8.7051 | 0.1000 | | | 34.2308 |
| S9 | aspheric | 4.3924 | 0.4500 | 1.55 | 56.1 | 3.4145 |
| S10 | aspheric | 3.7728 | 0.2046 | | | −81.2665 |
| S11 | aspheric | 2.8936 | 0.5475 | 1.65 | 23.5 | −19.3514 |
| S12 | aspheric | −7.1830 | 0.2583 | | | −7.7879 |
| S13 | aspheric | −2.9924 | 0.2000 | 1.54 | 55.7 | −0.0526 |
| S14 | aspheric | 2.6434 | 0.7700 | | | −32.7540 |
| S15 | spherical | infinite | | | | |

TABLE 20

| surface number | A4 | A6 | A8 | A10 | A12 |
|---|---|---|---|---|---|
| S1 | −1.0358E−02 | 7.5295E−03 | −2.5266E−02 | 1.8032E−02 | −4.5578E−03 |
| S2 | 8.4945E−03 | −7.3823E−02 | 8.7616E−02 | −1.7942E−01 | 2.3043E−01 |
| S3 | −1.1082E−02 | −4.8523E−02 | 6.6670E−02 | −1.3971E−01 | 2.2137E−01 |
| S4 | −9.6710E−03 | −8.0345E−02 | 2.1190E−01 | −4.6911E−01 | 7.4726E−01 |
| S5 | −5.3138E−02 | 2.8887E−02 | −1.1729E−01 | 2.1792E−01 | −2.9590E−01 |
| S6 | −3.9354E−03 | −5.2301E−02 | 8.0645E−02 | −1.9245E−01 | 1.9339E−01 |
| S7 | 3.6977E−02 | −3.1697E−01 | 2.1685E−01 | 7.9139E−01 | −2.4668E+00 |
| S8 | 1.8427E−01 | −8.3417E−01 | 1.2103E+00 | −8.2897E−01 | −9.4584E−02 |
| S9 | 1.6348E−01 | −5.3235E−02 | 8.2742E−01 | −9.2359E−01 | 7.0216E−01 |
| S10 | 1.8561E−02 | −3.0311E−02 | 4.3829E−02 | −8.0067E−02 | 6.9633E−02 |
| S11 | −4.6184E−02 | 4.9343E−02 | −1.7988E−01 | 1.9267E−01 | −1.0735E−01 |
| S12 | 1.5234E−01 | −1.0711E−01 | −5.2731E−02 | 8.2455E−02 | −3.6834E−02 |
| S13 | 1.2795E−01 | −1.3266E−01 | −7.4154E−03 | 7.2375E−02 | −4.5152E−02 |
| S14 | 7.0656E−02 | −1.7703E−01 | 1.4011E−01 | −6.2515E−02 | 1.7213E−02 |

| surface number | A14 | A16 | A18 | A20 |
|---|---|---|---|---|
| S1 | −3.5957E−03 | 2.8231E−03 | −7.6213E−04 | 7.6129E−05 |
| S2 | −1.6037E−01 | 6.2086E−02 | −1.2718E−02 | 1.0795E−03 |
| S3 | −1.8760E−01 | 8.6082E−02 | −2.0435E−02 | 1.9867E−03 |
| S4 | −7.3732E−01 | 4.2590E−01 | −1.3258E−01 | 1.7304E−02 |
| S5 | 2.5194E−01 | −1.2659E−01 | 3.7146E−02 | −5.0375E−03 |
| S6 | −7.8476E−02 | −5.8999E−03 | 1.7202E−02 | −4.5217E−03 |
| S7 | 3.1884E+00 | −2.1593E+00 | 7.5442E−01 | −1.0844E−01 |
| S8 | 6.4893E−01 | −4.8078E−01 | 1.5152E−01 | −1.8082E−02 |
| S9 | −3.4859E−01 | 1.0789E−01 | −1.8877E−02 | 1.4115E−03 |
| S10 | −3.3104E−02 | 9.1620E−03 | −1.4095E−03 | 9.3916E−05 |
| S11 | 3.3464E−02 | −5.4014E−03 | 3.3295E−04 | 3.5665E−06 |
| S12 | 7.4803E−03 | −5.4466E−04 | 2.8669E−05 | 4.5505E−06 |
| S13 | 1.3516E−02 | −2.2135E−03 | 1.9072E−04 | −6.7794E−06 |
| S14 | −2.9738E−03 | 3.1358E−04 | −1.8423E−05 | 4.6172E−07 |

TABLE 21

| parameter | | | | |
|---|---|---|---|---|
| f1 (mm) | f2 (mm) | f3 (mm) | f4 (mm) | f5 (mm) |
| numerical value 5.64 | −8.90 | 5.26 | −17.88 | −65.89 |

| parameter | | | | |
|---|---|---|---|---|
| f6 (mm) | f7 (mm) | f (mm) | TTL (mm) | ImgH (mm) |
| numerical value 3.28 | −2.58 | 4.05 | 5.00 | 3.40 |

Figures 14A, 14B:
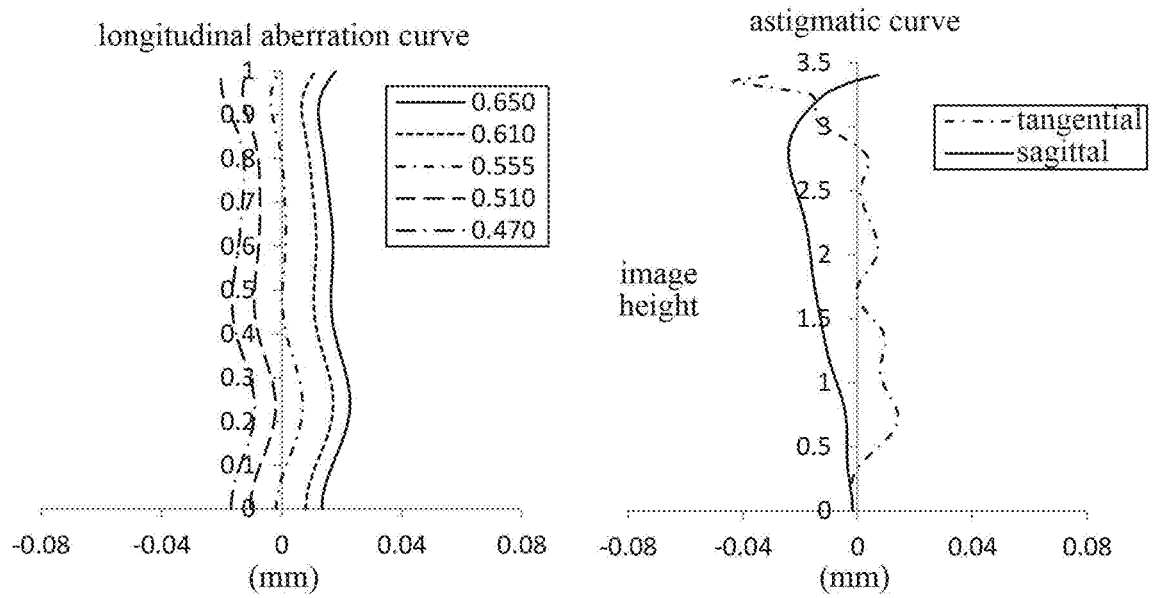
FIGS. 14A-14D respectively illustrate a longitudinal aberration curve, an astigmatic curve, a distortion curve, and a lateral color curve of the optical imaging lens assembly according to Embodiment 7.
Figures 14C, 14D:
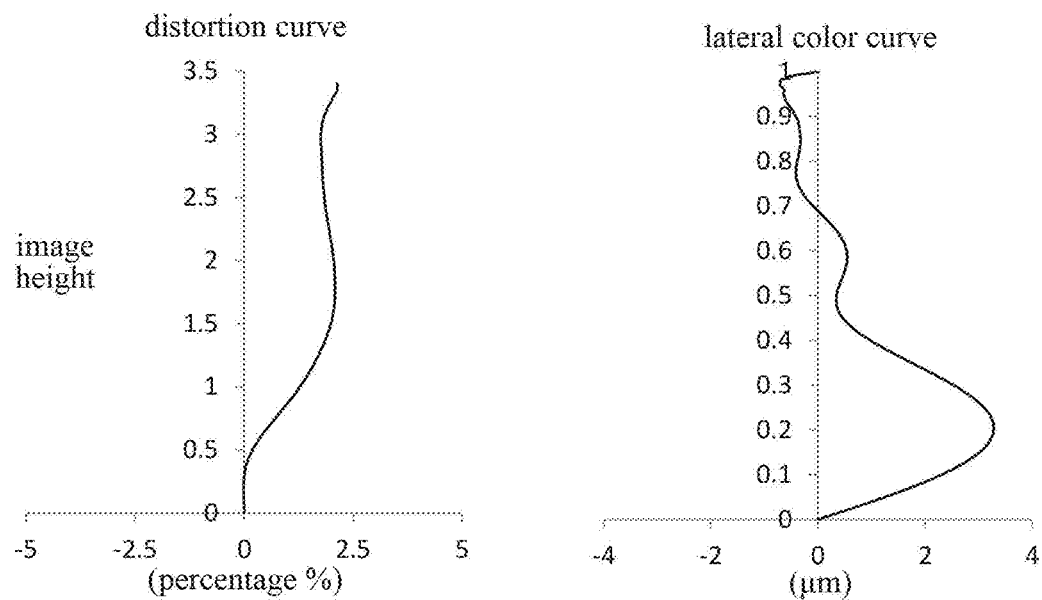

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
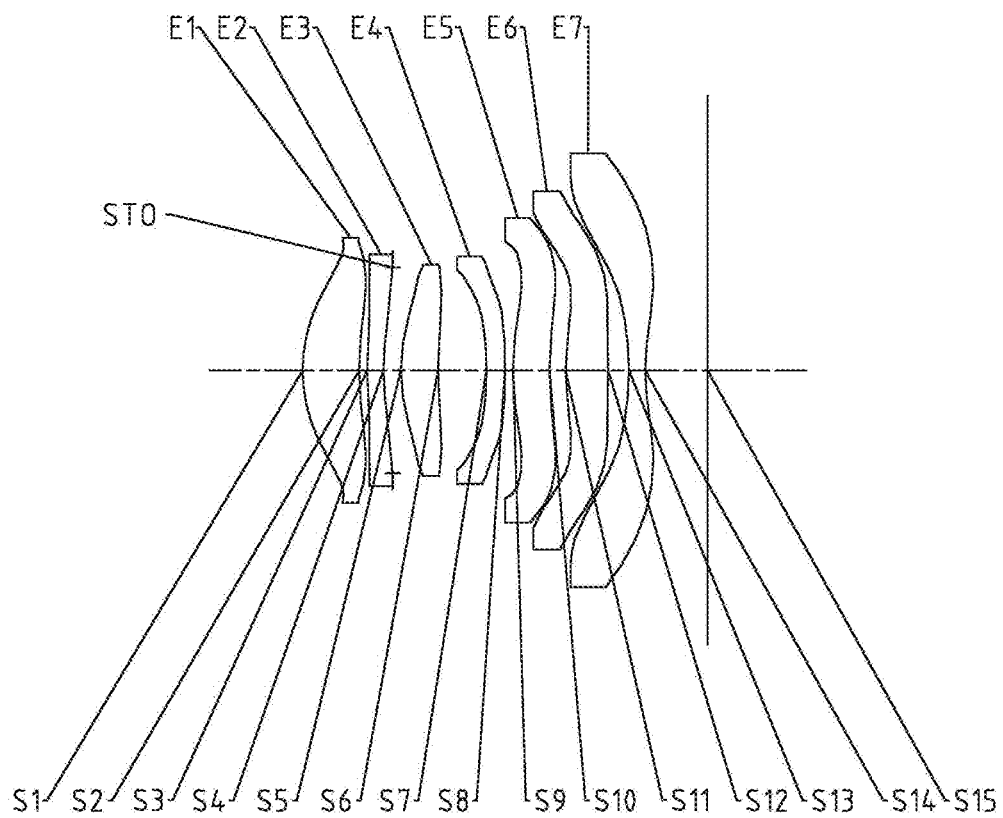
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a negative refractive power, an object-side surface S9 of the fifth lens E5 is a convex surface, and an image-side surface S10 of the fifth lens E5 is a concave surface. The object-side surface S9 and the image-side surface S10 of the fifth lens E5 are both aspheric surfaces.

The sixth lens E6 has a positive refractive power, an object-side surface S11 of the sixth lens E6 is a convex surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 22 shows the surface type, the radius of curvature, the thickness, the material and the conic coefficient of each lens of the optical imaging lens assembly in Embodiment 8. The units of the radius of curvature and the thickness are both millimeters (mm). Table 23 shows the high-order coefficients applicable to each aspheric surface in Embodiment 8. The surface type of each aspheric surface may be defined by the formula (1) given in Embodiment 1. Table 24 shows the effective focal lengths f1-f7 of the lenses in Embodiment 8, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 22

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9301 | 0.6982 | 1.55 | 56.1 | 0.0977 |
| S2 | aspheric | 4.5001 | 0.1000 | | | 1.3970 |
| S3 | aspheric | 6.7492 | 0.2000 | 1.67 | 20.4 | −78.3793 |
| S4 | aspheric | 2.9994 | 0.1141 | | | −23.5580 |
| STO | spherical | infinite | 0.1000 | | | 0.0000 |
| S5 | aspheric | 2.0479 | 0.4596 | 1.55 | 56.1 | −0.9285 |
| S6 | aspheric | 6.5994 | 0.5979 | | | 19.5911 |
| S7 | aspheric | −4.9084 | 0.2280 | 1.65 | 23.5 | 14.5971 |
| S8 | aspheric | −8.7238 | 0.1000 | | | 34.7736 |
| S9 | aspheric | 4.3326 | 0.4500 | 1.55 | 56.1 | 3.4698 |
| S10 | aspheric | 3.7605 | 0.1988 | | | −72.0571 |
| S11 | aspheric | 2.8621 | 0.5256 | 1.65 | 23.5 | −19.5498 |
| S12 | aspheric | −7.4791 | 0.2577 | | | −7.6318 |
| S13 | aspheric | −3.0241 | 0.2000 | 1.54 | 55.7 | −0.0488 |
| S14 | aspheric | 2.6343 | 0.7700 | | | −29.6750 |
| S15 | spherical | infinite | | | | |

TABLE 23

| surface number | A4 | A6 | A8 | A10 | A12 |
|---|---|---|---|---|---|
| S1 | −1.0598E−02 | 8.1365E−03 | −2.9595E−02 | 3.0017E−02 | −1.9679E−02 |
| S2 | 3.3370E−03 | −5.3208E−02 | 6.8694E−02 | −1.9007E−01 | 2.5728E−01 |
| S3 | −1.8428E−02 | −8.8299E−03 | −3.0552E−03 | −8.0764E−02 | 1.8925E−01 |
| S4 | −1.5393E−02 | −4.9361E−02 | 1.5397E−01 | −4.2033E−01 | 7.3144E−01 |
| S5 | −5.6634E−02 | 4.2122E−02 | −1.4631E−01 | 2.6312E−01 | −3.4355E−01 |
| S6 | −4.9024E−03 | −5.6739E−02 | 9.9931E−02 | −2.1792E−01 | 1.9919E−01 |
| S7 | 3.7470E−02 | −3.2055E−01 | 2.2395E−01 | 7.9880E−01 | −2.5157E+00 |
| S8 | 1.8673E−01 | −8.4568E−01 | 1.2365E+00 | −8.8405E−01 | −5.0996E−03 |
| S9 | 1.6433E−01 | −5.1526E−01 | 7.6755E−01 | −8.3182E−01 | 6.2025E−01 |
| S10 | −1.1265E−03 | 4.8557E−02 | −9.5383E−02 | 6.2104E−02 | −2.0877E−02 |
| S11 | −4.0905E−02 | 3.8442E−02 | −1.5293E−01 | 1.4857E−01 | −6.7077E−02 |
| S12 | 1.6338E−01 | −1.3007E−01 | −3.3525E−02 | 7.3816E−02 | −3.4410E−02 |
| S13 | 1.4772E−01 | −1.9810E−01 | 7.9416E−02 | 1.1789E−02 | −2.0523E−02 |
| S14 | 6.6212E−02 | −1.8238E−01 | 1.5155E−01 | −7.0396E−02 | 2.0085E−02 |

| surface number | A14 | A16 | A18 | A20 |
|---|---|---|---|---|
| S1 | 6.6401E−03 | −1.0266E−03 | −3.2766E−06 | 1.5030E−05 |
| S2 | −1.7706E−01 | 6.6498E−02 | −1.3108E−02 | 1.0669E−03 |
| S3 | −1.6991E−01 | 7.6711E−02 | −1.7488E−02 | 1.6181E−03 |
| S4 | −7.3592E−01 | 4.2252E−01 | −1.2957E−01 | 1.6607E−02 |
| S5 | 2.8625E−01 | −1.4246E−01 | 4.1028E−02 | −5.3596E−03 |
| S6 | −5.7710E−02 | −2.9501E−02 | 2.7105E−02 | −5.9881E−03 |
| S7 | 3.2805E+00 | −2.2480E+00 | 7.9690E−01 | −1.1640E−01 |
| S8 | 5.6168E−01 | −4.3373E−01 | 1.3851E−01 | −1.6638E−02 |
| S9 | −3.0300E−01 | 9.2187E−02 | −1.5801E−02 | 1.1476E−03 |
| S10 | 3.5144E−03 | −1.4646E−05 | −1.1125E−04 | 1.4798E−05 |
| S11 | 1.3054E−02 | 3.2441E−04 | −4.9980E−04 | 5.2561E−05 |
| S12 | 6.9896E−03 | −4.6602E−04 | −3.7485E−05 | 5.0163E−06 |
| S13 | 7.4722E−03 | −1.3303E−03 | 1.1989E−04 | −4.3772E−06 |
| S14 | −3.5903E−03 | 3.9212E−04 | −2.3930E−05 | 6.2529E−07 |

TABLE 24

| | parameter | | | | |
|---|---|---|---|---|---|
| | f1 (mm) | f2 (mm) | f3 (mm) | f4 (mm) | f5 (mm) |
| numerical value | 5.65 | −8.88 | 5.25 | −17.86 | −72.21 |
| | parameter | | | | |
| | f6 (mm) | f7 (mm) | f (mm) | TTL (mm) | ImgH (mm) |
| numerical value | 3.28 | −2.59 | 4.05 | 5.00 | 3.36 |

Figure 16A:
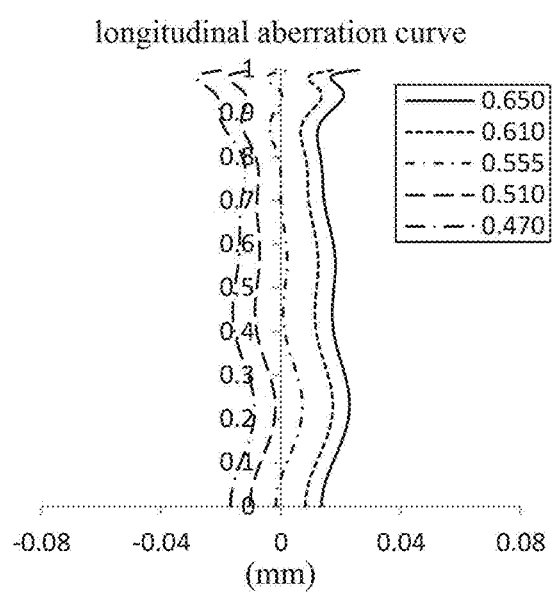
FIGS. 16A-16D respectively illustrate a longitudinal aberration curve, an astigmatic curve, a distortion curve, and a lateral color curve of the optical imaging lens assembly according to Embodiment 8.
Figure 16B:
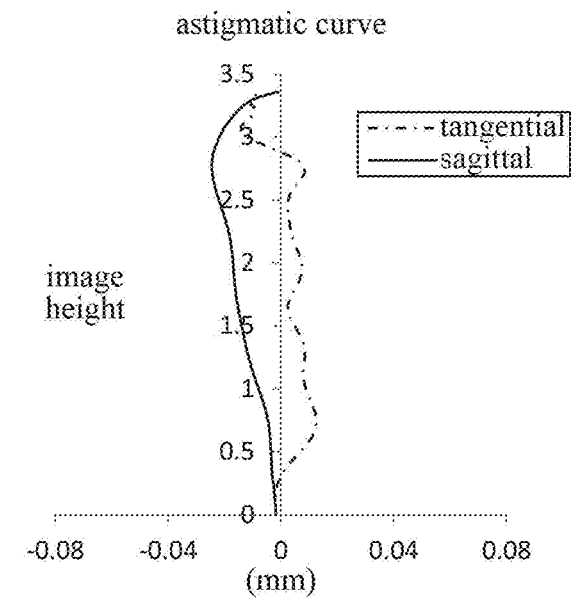
Figure 16C:
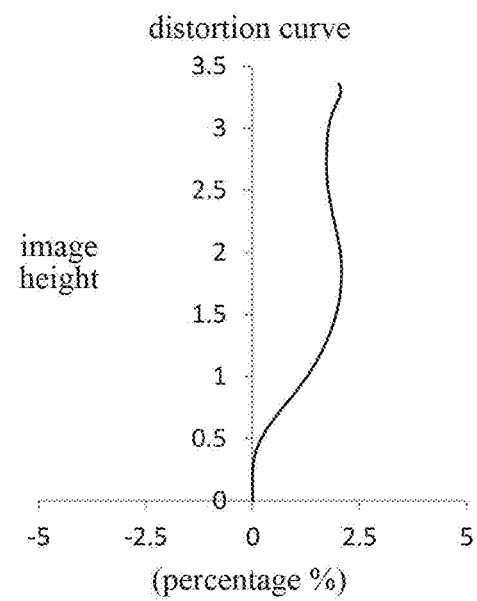
Figure 16D:
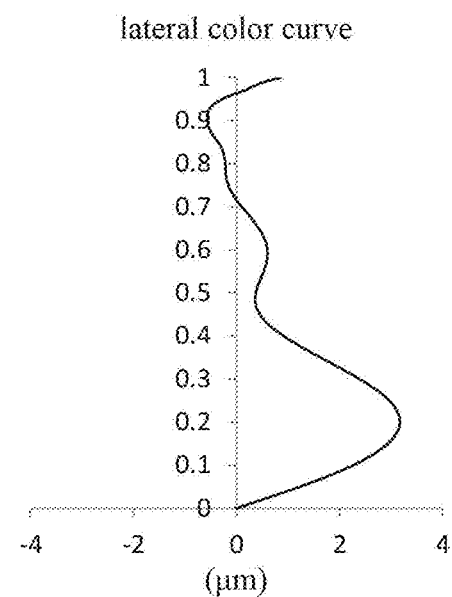

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

Embodiment 9

Figure 17:
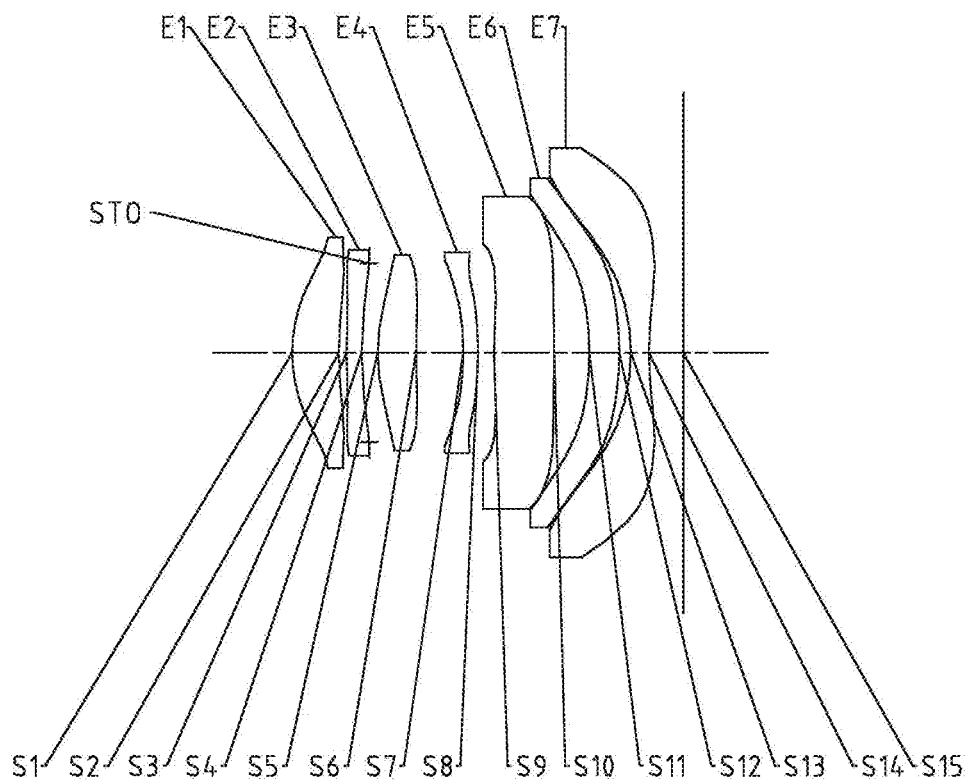
FIG. 17 is a schematic structural diagram illustrating an optical imaging lens assembly according to Embodiment 9 of the present disclosure.

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly includes, sequentially along an optical axis from an object side to an image side, a first lens E1, a second lens E2, a third lens E3, a fourth lens E4, a fifth lens E5, a sixth lens E6, a seventh lens E7, and an image plane S15.

The first lens E1 has a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

The second lens E2 has a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

The third lens E3 has a positive refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

The fourth lens E4 has a negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

The fifth lens E5 has a positive refractive power, an object-side surface S9 of the fifth lens E5 is a convex surface, and an image-side surface S10 of the fifth lens E5 is a convex surface. The object-side surface S9 and the image-side surface S10 of the fifth lens E5 are both aspheric surfaces.

The sixth lens E6 has a negative refractive power, an object-side surface S11 of the sixth lens E6 is a concave surface, and an image-side surface S12 of the sixth lens E6 is a convex surface. The object-side surface S11 and the image-side surface S12 of the sixth lens E6 are both aspheric surfaces.

The seventh lens E7 has a negative refractive power, an object-side surface S13 of the seventh lens E7 is a concave surface, and an image-side surface S14 of the seventh lens E7 is a concave surface. The object-side surface S13 and the image-side surface S14 of the seventh lens E7 are both aspheric surfaces.

Light from an object sequentially passes through the surfaces S1-S14 and finally forms an image on the image plane S15.

Alternatively, the optical imaging lens assembly of this embodiment may further include a diaphragm STO disposed between the second lens E2 and the third lens E3.

Table 25 shows the surface type, the radius of curvature, the thickness, the material and the conic coefficient of each lens of the optical imaging lens assembly in Embodiment 9. The units of the radius of curvature and the thickness are both millimeters (mm). Table 26 shows the high-order coefficients applicable to each aspheric surface in Embodiment 9. The surface type of each aspheric surface may be defined by the formula (1) given in Embodiment 1. Table 27 shows the effective focal lengths f1-f7 of the lenses in Embodiment 9, the total effective focal length f of the optical imaging lens assembly, the total track length TTL of the optical imaging lens assembly, and the half of the diagonal length ImgH of the effective pixel area on the image plane S15 of the optical imaging lens assembly.

TABLE 25

| | | | | material | | |
|---|---|---|---|---|---|---|
| surface number | surface type | radius of curvature | thick-ness | re-fractive index | abbe number | conic coefficient |
| OBJ | spherical | infinite | infinite | | | |
| S1 | aspheric | 1.9335 | 0.5976 | 1.55 | 56.1 | −0.0771 |
| S2 | aspheric | 5.3021 | 0.1000 | | | 2.2458 |
| S3 | aspheric | 19.5007 | 0.1900 | 1.67 | 20.4 | −18.3149 |
| S4 | aspheric | 4.5692 | 0.1001 | | | −14.6917 |
| STO | spherical | infinite | 0.1050 | | | 0.0000 |
| S5 | aspheric | 2.2360 | 0.4914 | 1.55 | 56.1 | −1.1196 |
| S6 | aspheric | 10.7740 | 0.6018 | | | 55.6559 |
| S7 | aspheric | −4.6588 | 0.1900 | 1.65 | 23.5 | 7.7831 |
| S8 | aspheric | −5.7746 | 0.2056 | | | 7.2873 |
| S9 | aspheric | 13.0796 | 0.7695 | 1.55 | 56.1 | 10.3464 |
| S10 | aspheric | −8.4517 | 0.4473 | | | 15.9770 |
| S11 | aspheric | −4.4441 | 0.3834 | 1.65 | 23.5 | 2.1226 |
| S12 | aspheric | −4.7584 | 0.1491 | | | −0.4540 |
| S13 | aspheric | −2.5910 | 0.2294 | 1.54 | 55.7 | −0.0258 |
| S14 | aspheric | 4.3858 | 0.4400 | | | −79.8559 |
| S15 | spherical | infinite | | | | |

TABLE 26

| surface number | A4 | A6 | A8 | A10 | A12 |
|---|---|---|---|---|---|
| S1 | −5.8900E−03 | −5.8800E−03 | −2.0680E−02 | 6.2551E−02 | −1.0139E−01 |
| S2 | 2.1202E−02 | −1.3827E−01 | 1.7982E−01 | −1.5434E−01 | 6.1302E−02 |
| S3 | 4.3279E−02 | −2.6570E−01 | 5.7395E−01 | −8.3373E−01 | 8.5031E−01 |
| S4 | 7.3680E−03 | −1.8286E−01 | 4.7393E−01 | −7.6972E−01 | 8.9502E−01 |
| S5 | −3.2850E−02 | −5.8330E−02 | 1.3316E−01 | −2.6597E−01 | 3.4523E−01 |
| S6 | −2.3820E−02 | −5.3670E−02 | 6.9685E−02 | −1.8509E−01 | 2.9331E−01 |
| S7 | 2.9473E−02 | −6.0161E−01 | 1.8718E+00 | −3.7774E+00 | 5.1470E+00 |
| S8 | 8.4827E−02 | −6.3102E−01 | 1.4213E+00 | −2.0083E+00 | 1.9533E+00 |
| S9 | 8.9678E−02 | −2.6491E−01 | 2.2395E−01 | 3.1087E−02 | −3.3284E−01 |
| S10 | 1.0548E−01 | −8.4220E−02 | 3.4871E−01 | −7.3200E−01 | −6.1000E−04 |
| S11 | −6.5230E−02 | 1.3239E−01 | −2.4239E−01 | 2.5001E−01 | −1.5356E−01 |
| S12 | −1.4666E−01 | 4.2824E−01 | −6.0790E−01 | 4.5796E−01 | −2.0550E−01 |
| S13 | −1.3918E−01 | 4.7142E−01 | −6.7168E−01 | 5.0459E−01 | −2.2231E−01 |
| S14 | 5.3414E−02 | −7.0960E−02 | 1.5245E−02 | 9.7260E−03 | −6.9900E−03 |

| surface number | A14 | A16 | A18 | A20 |
|---|---|---|---|---|
| S1 | 9.2285E−02 | −4.8930E−02 | 1.3789E−02 | −1.5800E−03 |
| S2 | 7.3500E−03 | −1.5310E−02 | 4.9290E−03 | −5.2000E−04 |
| S3 | −5.9798E−01 | 2.7733E−01 | −7.5570E−02 | 9.0990E−03 |
| S4 | −7.4440E−01 | 4.2261E−01 | −1.4525E−01 | 2.2633E−02 |
| S5 | −3.0515E−01 | 1.8425E−01 | −6.6500E−02 | 1.0577E−02 |
| S6 | −2.8377E−01 | 1.7663E−01 | −6.5290E−02 | 1.0666E−02 |
| S7 | −4.3976E+00 | 2.2378E+00 | −6.2040E−01 | 7.1452E−02 |
| S8 | −1.1586E+00 | 3.6957E−01 | −5.0750E−02 | 9.6700E−04 |
| S9 | 4.1244E−01 | −2.5595E−01 | 8.2466E−02 | −1.0990E−02 |
| S10 | 7.6100E−04 | −1.6000E−04 | 1.1100E−05 | 0.0000E+00 |
| S11 | 5.7788E−02 | −1.3020E−02 | 1.6110E−03 | −8.4000E−05 |
| S12 | 5.7107E−02 | −9.6600E−03 | 9.1100E−04 | −3.7000E−05 |
| S13 | 5.9688E−02 | −9.6300E−03 | 8.5900E−04 | −3.3000E−05 |
| S14 | 1.9430E−03 | −2.9000E−04 | 2.2400E−05 | −7.2000E−07 |

TABLE 27

| parameter | | | | |
|---|---|---|---|---|
| f1 (mm) | f2 (mm) | f3 (mm) | f4 (mm) | f5 (mm) |
| numerical value 5.25 | −9.01 | 5.07 | −40.14 | 9.52 |

| parameter | | | | |
|---|---|---|---|---|
| f6 (mm) | f7 (mm) | f (mm) | TTL (mm) | ImgH (mm) |
| numerical value −200.17 | −3.00 | 4.22 | 5.00 | 3.34 |

Figure 18A:
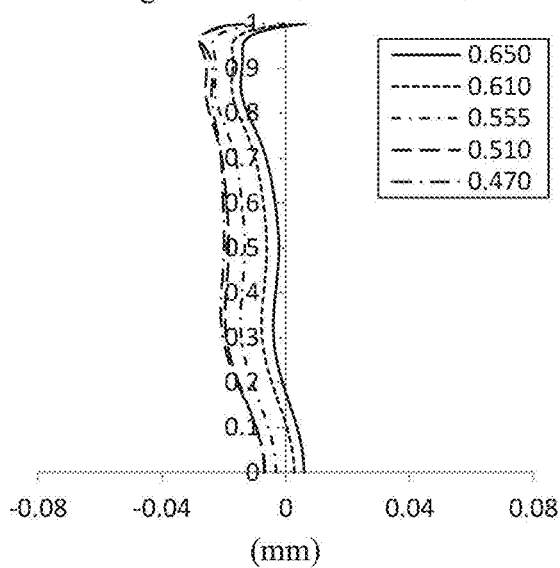
FIGS. 18A-18D respectively illustrate a longitudinal aberration curve, an astigmatic curve, a distortion curve, and a lateral color curve of the optical imaging lens assembly according to Embodiment 9.
Figure 18B:
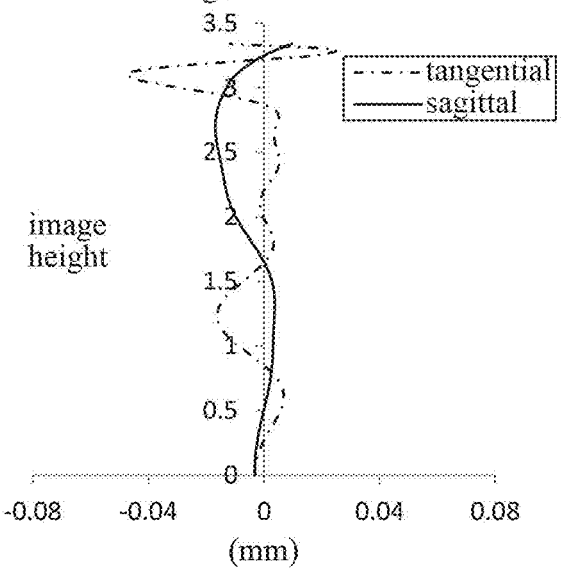
Figure 18C:
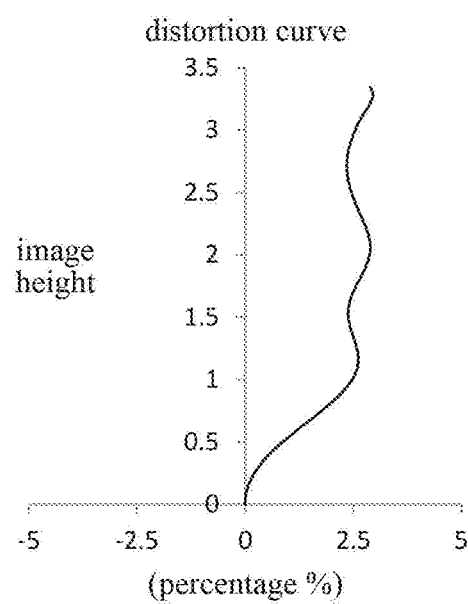
Figure 18D:
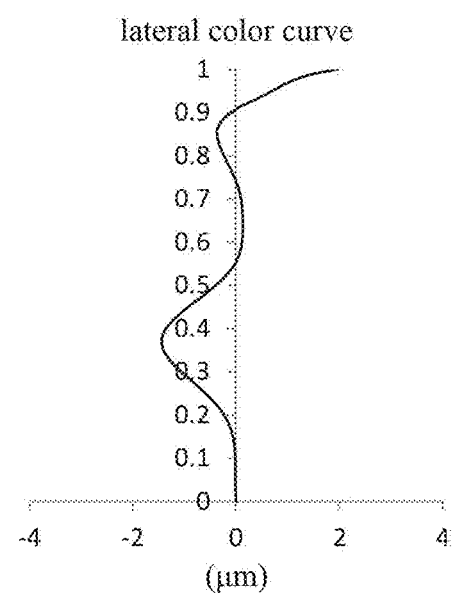

FIG. 18A illustrates the longitudinal aberration curve of the optical imaging lens assembly according to Embodiment 9, representing deviations of focal points of light of different wavelengths converged after passing through the lens assembly. FIG. 18B illustrates the astigmatic curve of the optical imaging lens assembly according to Embodiment 9, representing a curvature of the tangential image plane and a curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the lens assembly. It can be seen from FIGS. 18A-18D that the optical imaging lens assembly according to Embodiment 9 can achieve a good imaging quality.

To sum up, Embodiments 1-9 respectively satisfy the relationships shown in Table 28 below.

TABLE 28

| Conditional Expression | Embodiment | | | | | | | | |
|---|---|---|---|---|---|---|---|---|---|
| | 1 | 2 | 3 | 4 | 5 | 6 | 7 | 8 | 9 |
| f/EPD | 1.56 | 1.56 | 1.68 | 1.54 | 1.66 | 1.52 | 1.48 | 1.46 | 1.68 |
| f2/f7 | 3.17 | 3.21 | 2.41 | 3.36 | 3.20 | 3.36 | 3.45 | 3.43 | 3.00 |
| (T23 + T34 + T45)/(T56 + T67) | 1.85 | 2.29 | 1.72 | 1.78 | 1.59 | 1.82 | 1.95 | 2.00 | 1.70 |
| TTL/ImgH | 1.46 | 1.47 | 1.50 | 1.46 | 1.41 | 1.47 | 1.47 | 1.49 | 1.50 |
| FOV (°) | 78.7 | 78.3 | 75.3 | 78.7 | 77.4 | 78.8 | 78.8 | 78.2 | 75.0 |
| TTL/f | 1.22 | 1.23 | 1.19 | 1.23 | 1.18 | 1.23 | 1.23 | 1.23 | 1.18 |
| \|f/f5\| | 0.14 | 0.00 | 0.45 | 0.11 | 0.26 | 0.10 | 0.06 | 0.06 | 0.44 |
| f/f6 | 1.29 | 1.09 | −0.08 | 1.27 | 0.73 | 1.26 | 1.24 | 1.23 | −0.02 |
| T56/T67 | 0.81 | 0.95 | 3.07 | 0.79 | 1.41 | 0.76 | 0.79 | 0.77 | 3.00 |
| R3/R4 | 2.86 | 2.92 | 3.08 | 2.38 | 2.80 | 2.34 | 2.09 | 2.08 | 4.27 |
| R11/R12 | −0.63 | −1.47 | 0.83 | −0.51 | −8.86 | −0.47 | −0.40 | −0.38 | 0.93 |
| ImgH/(f/EPD) (mm) | 2.18 | 2.18 | 1.99 | 2.21 | 2.28 | 2.24 | 2.30 | 2.30 | 1.99 |

The present disclosure further provides an imaging device having a photosensitive element which may be a photosensitive charge-coupled device (CCD) or complementary metal-oxide semiconductor (CMOS) element. The imaging device may be an independent camera device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly comprising, sequentially along an optical axis from an object side to an image side, a first lens, a second lens, a third lens, a fourth lens, a fifth lens, a sixth lens, and a seventh lens,
   wherein the first lens has a positive refractive power, an object-side surface of the first lens is a convex surface, and an image-side surface of the first lens is a concave surface;
   the second lens has a negative refractive power, an object-side surface of the second lens is a convex surface, and an image-side surface of the second lens is a concave surface;
   the third lens has a positive refractive power or a negative refractive power;
   the fourth lens has a positive refractive power or a negative refractive power, and an object-side surface of the fourth lens is a concave surface;
   the fifth lens has a positive refractive power or a negative refractive power;
   the sixth lens has a positive refractive power or a negative refractive power;
   the seventh lens has a negative refractive power, an object-side surface of the seventh lens is a concave surface, and an image-side surface of the seventh lens is a concave surface; and
   a total effective focal length f of the optical imaging lens assembly and an entrance pupil diameter EPD of the optical imaging lens assembly satisfy: $f/EPD \leq 1.70$,
   wherein an effective focal length f2 of the second lens and an effective focal length f7 of the seventh lens satisfy: $2.8 < f2/f7 < 7.0$, and
   wherein an axial distance TTL from the object-side surface of the first lens to an image plane of the optical imaging lens assembly and half of a diagonal length ImgH of an effective pixel area on the image plane satisfy: $TTL/ImgH < 1 < 6$.

2. The optical imaging lens assembly according to claim 1, wherein the total effective focal length f of the optical imaging lens assembly and an effective focal length f5 of the fifth lens satisfy: $|f/f5| \leq 1.0$.

3. The optical imaging lens assembly according to claim 1, wherein the total effective focal length f of the optical imaging lens assembly and an effective focal length f6 of the sixth lens satisfy: $-0.5 < f/f6 < 1.5$.

4. The optical imaging lens assembly according to claim 1, wherein a radius of curvature R3 of the object-side surface of the second lens and a radius of curvature R4 of the image-side surface of the second lens satisfy: $2 < R3/R4 < 5$.

5. The optical imaging lens assembly according to claim 1, wherein a radius of curvature R11 of an object-side surface of the sixth lens and a radius of curvature R12 of an image-side surface of the sixth lens satisfy: $-10 < R11/R12 < 5$.

6. The optical imaging lens assembly according to claim 1, wherein the optical imaging lens assembly further comprises a diaphragm disposed between the second lens and the third lens.

7. The optical imaging lens assembly according to claim 1, wherein a maximum field-of-view FOV of the optical imaging lens assembly satisfies: $70° < FOV < 80°$.

8. The optical imaging lens assembly according to claim 1, wherein an axial distance TTL from the object-side surface of the first lens to an image plane of the optical imaging lens assembly and the total effective focal length f of the optical imaging lens assembly satisfy: $1.0 < TTL/f < 2.0$.

9. An optical imaging lens assembly comprising, sequentially along an optical axis from an object side to an image side, a first lens, a second lens, a third lens, a fourth lens, a fifth lens, a sixth lens, and a seventh lens,
   wherein each of the first lens and the third lens has a positive refractive power;
   at least one of the second lens or the seventh lens has a negative refractive power;
   each of the fourth lens, the fifth lens, and the sixth lens has a positive refractive power or a negative refractive power;
   an object-side surface of the first lens is a convex surface, and an image-side surface of the first lens is a concave surface;
   an object-side surface of the fourth lens is a concave surface;
   an object-side surface of the fifth lens is a convex surface;
   an object-side surface and an image-side surface of the seventh lens are concave surfaces; and
   half of a diagonal length ImgH of an effective pixel area on an image plane of the optical imaging lens assembly, a total effective focal length f of the optical imaging lens assembly, and an entrance pupil diameter EPD of the optical imaging lens assembly satisfy:
   $1 \text{ mm} < ImgH/(f/EPD) < 3 \text{ mm}$,
   wherein an object-side surface of the second lens is a convex surface, and an image-side surface of the second lens is a concave surface, and a radius of curvature R3 of the object-side surface of the second lens and a radius of curvature R4 of the image-side surface of the second lens satisfy: $2 < R3/R4 \leq 3.08$, and
   wherein the optical imaging lens assembly satisfies $1.5 < (T23+T34+T45)/(T56+T67) < 2.0$, where T23 is a spacing distance on the optical axis between the second lens and the third lens; T34 is a spacing distance on the optical axis between the third lens and the fourth lens; T45 is a spacing distance on the optical axis between the fourth lens and the fifth lens; T56 is a spacing distance on the optical axis between the fifth lens and the sixth lens; and T67 is a spacing distance on the optical axis between the sixth lens and the seventh lens.

10. The optical imaging lens assembly according to claim 9, wherein an effective focal length f2 of the second lens and an effective focal length f7 of the seventh lens satisfy: $2.8 < f2/f7 < 7.0$.

11. The optical imaging lens assembly according to claim 9, wherein the total effective focal length f of the optical imaging lens assembly and an effective focal length f5 of the fifth lens satisfy: $|f/f5|\leq 1.0$.

12. The optical imaging lens assembly according to claim 9, wherein the total effective focal length f of the optical imaging lens assembly and an effective focal length f6 of the sixth lens satisfy: $-0.5<f/f6<1.5$.

13. The optical imaging lens assembly according to claim 9, wherein the optical imaging lens assembly further comprises a diaphragm disposed between the second lens and the third lens.

14. The optical imaging lens assembly according to claim 13, wherein the spacing distance T56 on the optical axis between the fifth lens and the sixth lens and the spacing distance T67 on the optical axis between the sixth lens and the seventh lens satisfy: $0<T56/T67<5$.

15. The optical imaging lens assembly according to claim 14, wherein an axial distance TTL from the object-side surface of the first lens to the image plane of the optical imaging lens assembly and the total effective focal length f of the optical imaging lens assembly satisfy: $1.0<TTL/f<2.0$.

16. The optical imaging lens assembly according to claim 14, wherein an axial distance TTL from the object-side surface of the first lens to the image plane of the optical imaging lens assembly and the half of the diagonal length ImgH of the effective pixel area on the image plane satisfy: $TTL/ImgH<1.6$.

* * * * *